US008556009B2

(12) United States Patent
Bartilson

(10) Patent No.: US 8,556,009 B2
(45) Date of Patent: Oct. 15, 2013

(54) SAFE, SUPER-EFFICIENT, FOUR-WHEELED VEHICLE EMPLOYING LARGE DIAMETER WHEELS WITH CONTINUOUS-RADIUS TIRES, WITH LEANING OPTION

(75) Inventor: Bradley Wayne Bartilson, Rolla, MO (US)

(73) Assignee: Bradley Wayne Bartilson, Rolla, MO (US)

(*) Notice: Subject to any disclaimer, the term of this patent is extended or adjusted under 35 U.S.C. 154(b) by 0 days.

(21) Appl. No.: 11/687,614

(22) Filed: Mar. 16, 2007

(65) Prior Publication Data
US 2008/0223637 A1 Sep. 18, 2008

Related U.S. Application Data

(63) Continuation-in-part of application No. 11/686,935, filed on Mar. 15, 2007, now Pat. No. 8,100,126, which is a continuation-in-part of application No. 11/686,314, filed on Mar. 14, 2007, now Pat. No. 7,808,214, which is a continuation-in-part of application No. 11/613,014, filed on Dec. 19, 2006, now Pat. No. 7,642,755.

(51) Int. Cl.
*B60K 6/448* (2007.10)

(52) U.S. Cl.
USPC ........................ 180/65.24; 280/5.52

(58) Field of Classification Search
USPC ............. 180/21, 211, 210, 89.1, 311, 65.26, 180/65.245, 65.24; 280/124.135, 5.52, 280/5.54, 86.75, 124.106, 5.521; 152/454, 152/549, 209.16
See application file for complete search history.

(56) References Cited

U.S. PATENT DOCUMENTS

| 1,032,544 | A | * | 7/1912 | Hess et al. ............... 152/549 |
| 2,152,938 | A | | 4/1939 | Welch et al. |
| 3,061,031 | A | * | 10/1962 | Packard .................. 180/21 |
| 3,899,359 | A | | 8/1975 | Stachurski |
| 4,045,075 | A | | 8/1977 | Pulver |
| 4,087,106 | A | | 5/1978 | Winchell |
| 4,148,192 | A | * | 4/1979 | Cummings ............. 160/65.26 |
| 4,215,553 | A | | 8/1980 | Poirier et al. |
| 4,215,735 | A | * | 8/1980 | Sato ........................ 152/454 |
| 4,489,242 | A | | 12/1984 | Worst |
| 4,546,997 | A | | 10/1985 | Smyers |
| 4,662,467 | A | * | 5/1987 | Arai et al. ............... 180/210 |
| 4,715,192 | A | | 12/1987 | Katz |
| 4,732,819 | A | | 3/1988 | Komuro |
| 4,752,697 | A | | 6/1988 | Lyons et al. |
| 4,910,414 | A | | 3/1990 | Krebs |
| 5,116,069 | A | * | 5/1992 | Miller .................... 180/210 |
| 5,401,056 | A | * | 3/1995 | Eastman ................. 280/785 |
| 5,495,905 | A | * | 3/1996 | Fini, Jr. .................. 180/21 |
| 5,729,463 | A | | 3/1998 | Koenig et al. |

(Continued)

FOREIGN PATENT DOCUMENTS

WO    WO 2005/078892    8/2005

*Primary Examiner* — Hau Phan
(74) *Attorney, Agent, or Firm* — Woodcock Washburn LLP

(57) ABSTRACT

A "super fuel efficient", safe, low-cost and yet high performance 4-wheeled vehicle is configured with motorcycle wheels and tires having continuous radius tires and of outside diameter (20-26 inches). A special configuration of the invention permits a 4-wheeled vehicle to naturally camber while engaging a corner, or while maneuvering on a slope. Integration of a "short-cycling", low storage mass hybrid drivetrain into the vehicle, and further, an exhaust heat energy recovery system, secures the efficiency opportunity.

24 Claims, 25 Drawing Sheets

(56) References Cited

U.S. PATENT DOCUMENTS

| | | | |
|---|---|---|---|
| 5,857,336 A * | 1/1999 | Paul et al. | 60/597 |
| 5,910,722 A | 6/1999 | Lyons et al. | |
| 5,934,395 A | 8/1999 | Koide et al. | |
| 5,998,885 A | 12/1999 | Tamor et al. | |
| 6,118,237 A | 9/2000 | Kikuchi et al. | |
| 6,170,838 B1 | 1/2001 | Laurent et al. | |
| 6,265,851 B1 * | 7/2001 | Brien et al. | 320/162 |
| 6,394,209 B1 | 5/2002 | Goehring et al. | |
| 6,437,544 B1 | 8/2002 | Yang | |
| 6,449,554 B2 | 9/2002 | Yamawaki | |
| 6,464,026 B1 | 10/2002 | Horsley et al. | |
| 6,533,007 B1 * | 3/2003 | McMannis | 152/209.16 |
| 6,605,773 B2 | 8/2003 | Kok et al. | |
| 6,651,433 B1 | 11/2003 | George, Jr. | |
| 6,724,100 B1 | 4/2004 | Gabriel | |
| 6,805,362 B1 | 10/2004 | Melcher | |
| 6,876,098 B1 | 4/2005 | Gray, Jr. | |
| 6,941,990 B2 * | 9/2005 | Rooney | 152/454 |
| 6,994,360 B2 | 2/2006 | Kuang et al. | |
| 7,004,273 B1 * | 2/2006 | Gruenwald et al. | 180/65.245 |
| 7,068,017 B2 * | 6/2006 | Willner et al. | 323/272 |
| 7,078,877 B2 | 7/2006 | Salasoo et al. | |
| 7,086,017 B1 | 8/2006 | Bloom | |
| 7,100,369 B2 * | 9/2006 | Yamaguchi et al. | 60/324 |
| 7,104,060 B2 | 9/2006 | Ogawa et al. | |
| 7,109,408 B2 | 9/2006 | Kucherov et al. | |
| 7,109,686 B2 | 9/2006 | Schulte et al. | |
| 7,111,465 B2 | 9/2006 | Bell | |
| 7,138,730 B2 | 11/2006 | Lai | |
| 7,152,866 B2 * | 12/2006 | Chalin et al. | 280/124.135 |
| 7,248,030 B2 | 7/2007 | Yoshino | |
| 7,309,081 B1 | 12/2007 | Zuhlsdorf | |
| 7,370,480 B1 | 5/2008 | Balzano | |
| 7,494,141 B2 | 2/2009 | Bouton | |
| 7,642,755 B2 | 1/2010 | Bartilson et al. | |
| 7,802,800 B2 | 9/2010 | Melcher | |
| 7,807,917 B2 | 10/2010 | Atanackovic | |
| 7,900,725 B2 | 3/2011 | Heinzmann et al. | |
| 7,967,306 B2 | 6/2011 | Mighell | |
| 8,020,878 B2 | 9/2011 | Hara et al. | |
| 2003/0042866 A1 | 3/2003 | Minamiura et al. | |
| 2004/0100149 A1 | 5/2004 | Lai | |
| 2005/0040619 A1 | 2/2005 | Melcher | |
| 2005/0074645 A1 | 4/2005 | Fattic | |
| 2005/0204733 A1 | 9/2005 | Sasaki | |
| 2005/0204762 A1 | 9/2005 | Sasaki | |
| 2005/0206101 A1 | 9/2005 | Bouton | |
| 2006/0000651 A1 | 1/2006 | Stabler | |
| 2006/0237242 A1 | 10/2006 | Burke | |
| 2007/0181355 A1 | 8/2007 | Harris | |
| 2008/0142282 A1 | 6/2008 | Bartilson et al. | |
| 2008/0223632 A1 | 9/2008 | Bartilson et al. | |
| 2008/0258415 A1 | 10/2008 | Melcher | |
| 2010/0072721 A1 | 3/2010 | Plumley | |
| 2011/0193308 A1 | 8/2011 | Plumley | |
| 2011/0266079 A1 | 11/2011 | Boyd et al. | |

* cited by examiner

SAFE, SUPER-EFFICIENT, FOUR-WHEELED VEHICLE EMPLOYING LARGE DIAMETER WHEELS WITH CONTINUOUS-RADIUS TIRES, WITH LEANING OPTION

CROSS-REFERENCE TO RELATED APPLICATIONS

This application is a continuation-in-part of U.S. patent application Ser. No. 11,686,935, filed Mar. 15, 2007, now U.S. Pat. No. 8,100,126, issued Jan. 24, 2012, entitled HYBRID DRIVETRAIN WITH WASTE HEAT ENERGY CONVERSION INTO ELECTRICITY, which is a continuation-in-part of U.S. patent application Ser. No. 11/686,314, filed Mar. 14, 2007, now U.S. Pat. No. 7,808,214, issued Oct. 5, 2010, entitled SHORT-CYCLING SERIAL HYBRID DRIVETRAIN WITH HIGH POWER DENSITY STORAGE, which is a continuation-in-part of U.S. patent application Ser. No. 11/613,014, filed Dec. 19, 2006, now U.S. Pat. No. 7,642,755, issued Jan. 5, 2010, entitled METHOD AND APPARATUS TO MAXIMIZE STORED ENERGY IN ULTRACAPACITOR SYSTEMS. The content of each of the above-referenced applications are incorporated by reference herein in its entirety.

TECHNICAL FIELD

The present invention relates to the general area of improved energy efficiency, performance, driving excitement, and safety and of a four-wheeled vehicle.

BACKGROUND

In the art of higher efficiency transportation vehicles, vehicle weight is known by elementary physics and experience to be the strongest variable influencing fuel consumption. After losing 75% of the combustion energy to waste heat, current vehicles waste 95% of the remaining energy to moving the vehicle mass, resulting in an overall efficiency of just 2% in performing the desired function of moving the occupants. The waste heat loss is directly coupled to vehicle mass (engine and drivetrain size are proportional to vehicle mass per performance requirements).

In prior efforts to reduce vehicle weight automobile manufacturers developed "body-integral" design methodology, which merges the vehicle frame into the vehicle body structure, industry labeled as the "body-in-white". This improved on the prior "body-on-frame" methodology that was traditionally used for the design of American-manufactured automobiles and trucks up until the mid 1980s. However, the "body-integral" approach appears to have reached a threshold at approximately 2800 pounds, explaining the minor increase in fuel efficiency offered by currently advertised "high efficiency" vehicles. This may be understood in the current automobile manufacturer's method and use of continuous thickness sheets of metal which are then stretched into shape by molds, incurring use of material where the strength is not needed. Use of lighterweight materials offer some advantage, however, this impacts cost, negatively impacting the ultimate goal of lower total cost-of-ownership. Further, automobiles continue to be designed for 4-5 occupants negatively impacting vehicle weight. The wheels and tires of present 4-wheeled vehicles limit the extent of vehicle weight reduction and suspension options.

Motorcycles achieve a much more efficient ratio of vehicle-weight to passenger-weight. However, motorcycles, are market-limited, primarily used for enjoyment riding, as they do not provide a closed occupant configuration to provide additional safety to the occupants and to protect the occupants from the weather elements. Three-wheeled motorcycle variants with enclosures have been introduced with limited marketability, presumed due to poor experience with 3-wheeled ATVs (all terrain vehicles) and their subsequent forced market removal. Motorcycle frame construction is of the assembly of tubular steel and other irregular formed steel shapes.

U.S. Pat. No. 5,729,463 Describes a method for designing and producing light-weight automobile bodies, but this patent is focusing on applying various techniques aimed at reducing the mass of the current "Body-in-white" (car manufacturer terminology) structural design methodology. It does not consider a narrow vehicle with a roll-cage structure or a cambering chassis.

U.S. Pat. No. 4,045,075 describes a light-weight vehicle and body envelope construction for an "elongated wheel-based vehicle of relatively "narrow" track where the aspect ratio for wheel base to track is approximately 2:1 and 3:1. It states that the light-weight vehicle approach taught herein relies upon a central truss member within the passenger compartment which extends longitudinally and symmetrically between the wheel mounting positions as the main longitudinal bending load bearing member of the vehicle. The body frame is made from tubular aluminum construction, and the vehicle configuration drawings indicate a larger vehicle type, with 3 rows of seating, and 2 passengers positioned side-by-side per row of seating. The frame structure calls for an elongated wheelbase (comparable to American vehicles from the 1960s), and is aimed at providing a larger light-weight vehicle that overcomes the inferior ride and comfort characteristics associated with small, short wheel based vehicles know as sub-compact cars. The vehicle configuration consists of a frontal track and width of a sub-compact car, but with a significantly elongated vehicle length and a much longer wheelbase. The vehicle dimensions specify a wheelbase of 156 inches, a track width of 54 inches, an overall length of 224 inches, and a height of 48 inches. While this configuration would result in a vehicle weight that is lighter than the conventional body-integral structural design, it represents a comparatively large vehicle that is much heavier than the described invention. U.S. Pat. No. 4,045,075 does not refer to any wheel construction or type, nor does it impart specific motion or fuel efficiency improvements.

U.S. Pat. No. 4,087,106 Describes a 3 point cambering vehicle having a steerable front contact and laterally spaced rear contacts all engaged for cambering and continuous engagement with a support surface during cornering and other maneuvers. The configuration presents a 3-wheeled, human powered tricycle, with cambering to be actuated by the operator via standing and shifting weight in a natural manner on left and right foot pads secured to the respective free ends of the trailing arms. This 3 wheeled tricycle design is configured with the operator in a standing position, and uses small wheels.

U.S. Pat. No. 6,449,554 Describes a travel speed controller for an electrically-powered light-weight vehicle having a 2-wheeled scooter type configuration with the operator in a seated position. The focus is on the electronic travel speed controller for an electric vehicle, wherein the electronic sensor memorizes acceleration speeds and can accelerate the vehicle with no aid from an accelerator or foot pedals. Wheel and tire type, and any unique methodology related to type and operation is not discussed.

U.S. Pat. No. 4,732,819 Describes a light-weight, powered vehicle frame structure using a tubular frame construction for a 3-wheeled, 2-passenger type of vehicle. The invention claims to eliminate the problems attendant to conventional pipes used as a structural member adapted for light-weight vehicles such as motorcycles, and for small three or four-wheeled vehicles used for economic transportation or as off-road vehicles. The intent of the patent is to provide a vehicle body with a structural member that allows an outer plate to serve as a reinforcement member in the vehicle body frame of a light-weight vehicle and reduce the weight of a vehicle body construction. The configuration of the vehicle uses 2 front wheels and a single rear wheel design. The occupant configuration is for an operator in the front single seating position with a passenger in a rear single seating position.

US Patent 20060237242 Describes a light-weight surface vehicle using a multiplicity of modular light-weight vehicle sections to effect configurations, anywhere from a bus, to multiple-linked buses, to personal transportation in the form of a vehicle or bicycle. It describes the use of a serial hybrid propulsion system using and internal combustion engine of varying types and fuel sources, a generator, electric motors, utilizes a pulley belt gear ratio mechanism, and includes hydraulics for steering and brake systems, and an air compressor for better ride control. It additionally, discusses the use of bicycle or motorcycle wheels to achieve a light-weight vehicle configuration.

The development and market presence of current hybrid vehicles is an effort to increase fuel efficiency without changing the current vehicle platform. While market savvy, this approach is quite limited in fuel efficiency improvement; in view of the established relationship of fuel consumption to vehicle mass (EPA data: 1 gallon 1100 miles 1900 pounds). Beyond minor improvement in fuel economy over 25 years (1982 Honda Civic, 1500 pounds, actual 40 mpg, and a 2007 Prius, 2987 pounds, actual reported 42 mpg), FIG. 10 data exposes that if the "heavyweight" hybrids were corrected for having marketable, and comparable acceleration to their conventional counterparts, their resulting fuel economy would align with that of conventional vehicles. Viewed alternatively, the same fuel economy-acceleration performance could be achieved more simply by reducing the vehicle weight, including elimination of hybrid components. It is clearly important that hybrid drivetrain mass impact be examined in order to achieve market improvement in fuel economy.

Energy storage in hybrid drivetrains has incurred significant additional mass to the vehicle. In particular battery-based storage systems are comparatively low in power density (200 to 400 Wkg for today's advanced types), however, they are high in energy density (200 W-hrkg). In addressing the power demands and overcoming poor charge and discharge efficiencies (70-90% dependent upon technology and state-of-charge (SOC)), battery mass becomes a significant weight contributor. Excessive energy storage has led to hybrid designed for long cycle times (lengthy discharge and charge times).

The inability of batteries to charge and discharge at high rates and high efficiencies, has been an impetus to augment the storage with higher power density medium. e.g. ultracapacitors (~6000 Wkg) for the high rate conditions. Unfortunately the combination of batteries and ultracapacitors brings about other limitations, as well as added costs, complexity and reduced reliability. For a series combination of batteries and ultracapacitors, the battery limits the current rate, so little improvement in charge/discharge rate occurs. When used in parallel, the ultracacapacitors, whose characteristic voltage change is stronger than the battery for a given charge/discharge rate, the battery limits the capacity use. A pure ultra-capacitor storage solution was not envisioned for automobile application, as ultracapacitors are too low in energy storage (<lo W-hr/kg) to accommodate the mass-driven requirements of the current automobile platform.

Others have identified approaches with switched banks of UC's, or in combination with batteries, to avert the extreme voltage reduction that would be experienced by continuing to draw from a single UC. However, this methodology results in significant underutilization of the capability of the UCS (typically less than 50% as voltage input variations are limited to 2:1 for many devices). The additions of banks (either battery or UC) bring increased switching components/complexity, efficiency loss, increased weight (reducing vehicle efficiency) and cost.

U.S. Pat. No. 6,265,851 describes an electric vehicle power system for a semiconductor wafer handling application, having ultracapacitors and batteries as parallel sources connected to a source-selecting switch and having said switch direct its output only to a DC-DC converter which serves the motor load, however, this incurs the converter losses when no conversion is necessary.

Laid open US Pat App. US 2004/0100149 describes topologies for multiple energy sources, including UCs, and accommodates reverse power flow from the utility being driven (case of regenerative braking for a transportation vehicle). In the described topologies, all power is continuously directed through a power converter module, with inherent losses and limitations per device sizing.

U.S. Pat. No. 7,004,273 discusses a bank of ultracapacitors directly bussed to an engine-driven generator with a control management unit bringing the engine on and off to maintain the state-of-charge of the ultracapacitors. This approach does not address the inefficient ultracapacitor capacity utilization issue, resulting in extensive burden/cycling of the engine and/or significant oversizing of the ultracapacitor bank.

U.S. Pat. No. 7,109,686 describes the use of braking resistor and switch structure to assist in charging and discharging an ultracapacitor bank and to protect the ultracapacitor from excessive pre-charge current. A DC-DC converter is referenced as expensive, and its use is referenced only as an alternative method to pre-charge the ultracapacitor hank. While low in cost the use of the braking resistor diverts energy, thereby wasting said energy.

A solution which could extract more of an ultracapacitor's capacity would greatly assist in reducing wasted capacity and enable an all-ultracapacitor storage solution for a lightweight vehicle. Augmentation with thermal-to-electric recovery of waste heat furthers this potential.

The opportunity afforded by improving the thermal efficiency of internal combustion engines (ICE) (commonly 28% for gasoline, 34% for diesel engines) is well understood, however longstanding research and development efforts have not produced marked technical and/or market impacts. Turbo-charging and ceramic insulation of combustion chamber components have made the most significant impact, however, cost and the extent of efficiency improvement (~10%), has not led a to significant reduced fuel consumption on a functional work unit basis, and accordingly not impacted the per capita basis. Exhaust gas turbines with mechanically-connected generators have been presented as alternative, however, cost and efficiency have similarly preempted commercialization. Thermal-to-Electric devices and systems have also been presented to capture the waste stream energy, however, the device efficiencies for prior thermoelectric and thermionic cases, have been very low (<lo %), limiting the use to lesser power applications. Efficient use of prior devices were also limited to very high temperatures, typically requiring >700° C. The design of the thermal transfer system encapsulating the thermoelectric or thermionic devices have lacked adequate transfer surface and residence time, resulting in reduced energy extraction from the bulk stream.

In the case of transportation vehicles, having proliferated a high-mass (high load) basis contributes to the magnitude of the loss, and increases the magnitude and cost of thermal recovery options. Higher fuel prices have inspired the market for vehicles with hybrid drivetrains (ICE assisted by a generator (s) with energy storage system, yet the approximate 70% wasting of exhaust energy continues in these systems as well.

U.S. Pat. No. 4,148,192 describes a "parallel" internal combustion electric hybrid powerplant having thermoelectric devices positioned in such manner as to receive heat energy from the engine exhaust and deliver electrical energy to the system's battery. The thermal conversion elements are attached to the exterior surfaces of the exhaust pipe and the cylinder walls.

U.S. Pat. No. 4,489,242 Discusses the use of a stored energy system to provide the necessary energy for operation of a vehicle's accessories, and includes a suggestion for an exhaust-driven thermoelectric unit, amongst a multitude of options (without detail sufficient to build or determine viability of such an approach).

Laid-open application US200610000651 describes the same invention of the former U.S. Pat. No. 4,148,192

U.S. Pat. No. 5,857,336 Describes an exhaust-driven turbo-assisted positive displacement engine for a hybrid electric vehicle, and having a second exhaust passage with another turbine which mechanical turns a (mechanical) generator to recover additional energy when the waste-gate bypasses the first turbo.

U.S. Pat. No. 7,100,369 describes a thermoelectric device system extracting heat from the exhaust stream of an engine having a primary and secondary exhaust passages and control valves operated based upon engine load for optimization.

U.S. Pat. No. 6,605,773 presents a thermoelectric generator for a fuel-cell power plant of a vehicle, having a thermally-activated regulator controlling the heat source (fuel cell) and/or the cooling medium to the generator, thereby eliminating the cost and complexity of a DC-DC converter.

U.S. Pat. No. 7,068,017 describes a source regulation (impedance transformation) electrical system used to increase the efficiency of power transfer from a direct energy source (one example, of many, and not described with sufficient detail as to allow construction or viability) being a thermoelectric or thermionic device) to the load.

U.S. Pat. No. 7,111,465 presents improved thermoelectric generator design by thermal isolation of thermoelectric devices in an array.

Laid-open application US200510204762 presents a thermoelectric generation system interfaced to the combustion exhaust stream via a heatpump with liquid circulation system having an endothermic reaction.

Laid-open application US200510204733 presents the invention of the former US200510204762 with the introduction of the catalytic treatment of the exhaust, and options for integration and optimization with the thermoelectric system.

Laid-open application US200510074645 describes a thermoelectric generating system capturing heat from a solid oxide fuel cell, the generating system having a vacuum enclosure surrounding the thermoelectric devices (for thermal isolation).

There exist technical, approval agency, and marketing issues to overcome in achieving market success of a safe lightweight vehicle. The U.S. Department of Energy has concluded that the U.S. automakers "have the public convinced that high vehicle mass is required to be safe". Automobile collision fatality data indicates that incompatible bumper heights, causing "under-run" and "over-run" conditions are the predominant issues (personnel protection is highly diminished when the primary impact device is averted). The same federal standards exempt SUVs, pickups and minivans from standard 215 compliance, the very vehicles that are cause for the incompatibility and the resulting extent of damage and injury.

The present invention eliminates the foregoing problems attendant to conventional vehicle body construction methods that result in heavier vehicles, and from motorcycle shortcomings for occupant protection through the design and construction of a safe, light weight, and super-efficient four-wheeled vehicle using large diameter constant-radius wheels, and a short-cycling serial hybrid drivetrain with exhaust heat recovery of energy.

SUMMARY

The present invention addresses the primary factors identified in the background art that limit the capability of a four-wheeled vehicle to achieve high fuel efficiency, i.e., "super-efficiency" defined as in excess of 100 miles per gallon.

A further object is to reduce the cost of a 4 wheeled, enclosed passenger vehicle such that the purchaser achieves a real payback for purchasing a higher efficiency vehicle.

A further object is improve the agility and acceleration of a 4 wheeled vehicle (without compromising fuel efficiency) thereby providing new driving excitement (added enjoyment or fun).

Another object is to leverage components already in high volume manufacturing so as to aid in the achievement of low cost.

Another object is to maintain desirable ride characteristics of the 4 wheeled vehicle, while achieving weight reduction.

Another object is to increase the occupant safety and comfort of a lightweight vehicle.

Another object of the invention is to increase the design flexibility and cost of altering vehicle appearance and to reduce to the cost of collision repairs.

Another object is to achieve, as a special configuration of the present invention, a 4-wheeled leaning vehicle, to enable advanced cornering capability and added driving excitement.

An object of the invention is to extract a significant amount of waste energy available from the ICE through higher device (>15%) and transfer system efficiency, and to perform this extraction down to a much lower temperature (<200° C.).

Another object of this invention is to provide an electrical storage system which accepts high and variable rates of charge transfer, exhibits high efficiency, high reliability over many cycles, and high capacity utilization.

Another object of this invention is to effect a low-complexity, "no moving parts", solid-state transfer system, exhibiting low cost, and high reliability.

Another object of the invention is to create a low-mass design, thereby incurring minimal added weight burden to a high efficiency transportation vehicle.

Another object of the invention is to reduce or eliminate the requirement for noise abatement from the exhaust system.

Additional objects and advantages of the invention are advanced by the following description and may also be learned from the practice of the invention.

DETAILED DESCRIPTION OF ILLUSTRATIVE EMBODIMENTS

Vehicle power consumption is expressed as the sum of inertial, rolling, grade, and air drag resistances, accompanied by accessories power usage:

$$P_{load} = P_{inertia} + P_{tires} + P_{grade} + P_{drag} + P_{ace}$$

Where, $P_{inertia} = 0.5 \, M \, [\Delta v^2/\Delta t]$ $P_{tires} = C_\pi \, M \, gv$ (also stated as the tire rolling friction)

$P_{grade} = M \, gv \sin(\theta)$ ($\theta$ is the grade angle)

$P_{drag} = 0.5 \, \rho CDAv3/1000$ $P_{ace} = P_{alternator} + P_{air\ conditioning}$ Inertial, rolling and grade resistance terms dominate power consumption in city driving (typically at least 70% when air conditioning is operating, and up to 90% without air conditioning). Dependent upon grade work associated with a particular geography, these mass-dependent terms commonly comprise 40% of the power load on the highway.

Figure 10:
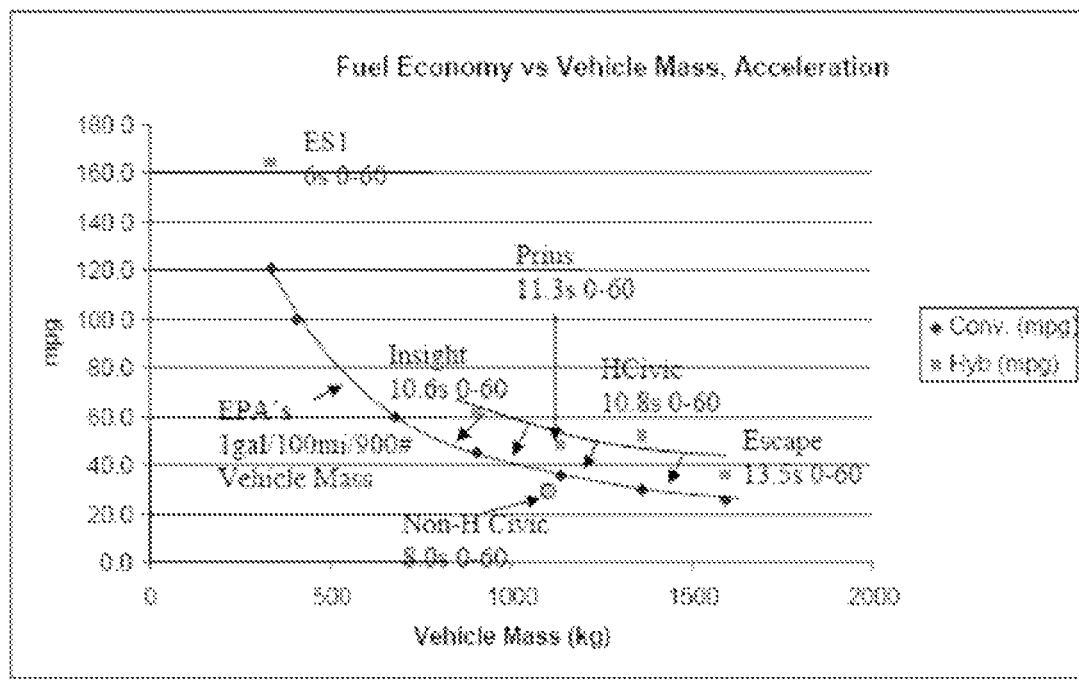
FIG. 10 displays the influence of vehicle mass upon fuel efficiency, the fuel efficiency and acceleration "sacrifice" of current hybrids, and the fuel efficiency and acceleration of the present invention.

Underpinning the aforementioned automobile limitations, the current design assumption of a "heavyweight" (2500-4000 pound) vehicle causes designers to select "heavyweight" automobile wheels and tires (typically 40-60 pounds in combined weight). Suspension components are accordingly heavy. Similarly, if the designer began the design assuming the common automobile tire and wheel, he would arrive at a heavy vehicle through dynamic and kinematic analysis, as ride and roll characteristics tend toward a 4-5:1 sprung/un-sprung weight ratio. The weight of energy-saving features, e.g. energy storage and recovery systems in hybrid drives, also increases (and their net benefit decreases) when accommodating such high vehicle mass. Extensive EPA vehicle data supports the requirement for a vehicle to be of less than 680 kg (1500 pounds) to achieve in excess of 100 mpg (FIG. 10, note the current vehicle invention performance labeled "ES 1" therein).

Unused load capacity strongly contributes to high vehicle weight and fuel consumption. United States Department of Transportation data indicates an average occupancy rate of 1.1 passengers per vehicle during the work week and 1.4 on the weekends. The present invention thus targets a 2 passenger vehicle to achieve improved vehicle and per-capita fuel consumption.

Through the use of continuously-radiused (motorcycle-style) tires and lower vehicle weight, the present invention also secures fuel savings through the reduction of rolling resistance. Due to higher stiffness, a motorcycle tire experiences less deformation (evidenced as a smaller "patch area of contact with the road surface) than an automobile tire. While basic understanding implies that patch area is a direct function of vehicle weight and inflation pressure, a motorcycle tire is designed such that it supports approximately twice the value of contact pressure to inflation pressure compared to an automobile tire. While significant efforts continue in the modeling of tire behavior, deformation and hysteresis effects are accepted as the leading effects in energy loss. Review of coefficient of rolling friction (Cr) data suggests an average of 0.007 for a motorcycle tire, compared to 0.012 for an automobile. The present invention's combined weight and superior rolling resistance coefficient then affords a 4.5× improvement over a current automobile in the rolling resistance component of the stated power consumption equation.

The present invention's use of "full size" motorcycle wheels and tires also preserves the higher ride and reliability characteristics of larger tires as compared to lightweight vehicle designs which roughly scale the entire vehicle, employing smaller (<20 inch diameter) tires.

In recognition of the final impact that wheel/tire, and total vehicle weight starting assumptions have on fuel efficiency, the present invention utilizes motorcycle wheels (typically, 20-26 inches outside diameter of the tire and of a combined weight of 18-25 pounds). Applying the 5:1 ratio rule, a designer arrives at 2600 pounds total vehicle weight given the common automobile un-sprung masses, and a predicted 1100 pound total vehicle weight for the present invention. Furthermore, the use of motorcycle-wheels support the desired use of common, high-volume components to achieve low vehicle cost. Additionally, motorcycle wheels are rated for highway speeds and have a load rating supporting the targeted gross vehicle weight rating of approximately 1200 pounds.

A typical automobile carrying 2 passengers would achieve a passenger-to-gross vehicle weight ratio of just 13% (3200 vehicle plus occupants). In that a common 400 pound motorcycle carrying a single 200 pound passenger can comfortably be operated at highway speeds and accelerate while carrying a single passenger, (33% passenger to gross vehicle weight ratio), the present invention targets a similar ratio (1200 pound vehicle plus occupants) to achieve superior fuel efficiency. The combined weight of two 400 pound motorcycles is summarily arrived at as the prescribed weight target for the present invention (curb weight) through the allowance of the "new parts" (full chassis and enclosure) being equal in weight to the subtracted common parts (1—engine, 1—transmission, 1 gas tank, etc.) of the two motorcycles in the prescribed configuration. If in the former equation, a 4:1 sprung/un-sprung ratio is used, an 880 pound vehicle weight is obtained, supporting the design point.

Figure 1:
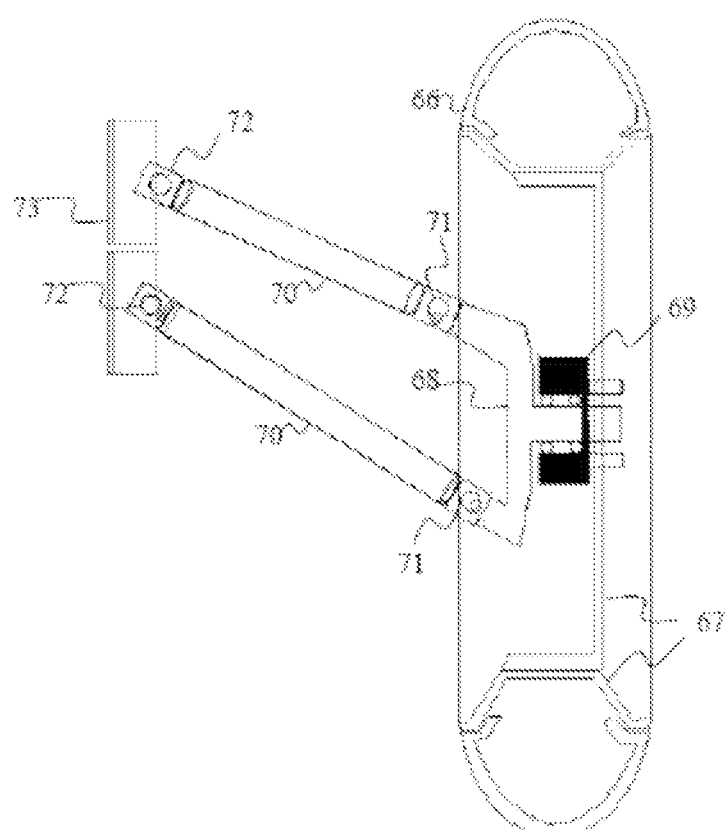
FIG. 1 is a crossection view of the large diameter, constant radius tire and accompanying wheel (motorcycle-type), with attached single-sided support structure consisting of upper and lower control arms, wheel spindle and hub.

In motorcycle design, the wheel axles are supported on two ends (fork in front, double-sided swingarm in the rear). In special cases, single-sided "swing arms" are used in racing motorcycles, supporting the axle from just one side. The present invention is unique in the use of motorcycle tires and wheels in a 4-wheel vehicle and employing single-sided support with automobile-style "control arms" (FIG. 1). Continuous radius (motorcycle-type) tire 66 is mounted and inflated upon a modified motorcycle wheel rim 67. Rim 67 is modified to accept bolted attachment to hub 69 which rotates about the shaft of spindle 69 via a bearing (single-sided support similar to an automobile wheel). Upper and lower control arms 70 are attached to the wheel spindle 68 by ball joints 71, and to the frame 73 by pin joints 72. Those skilled in the art recognize that a variety of options, e.g. alternative wheel, hub, control arm and spindle designs and joint types can be used to execute the art of the present invention.

Figure 2:
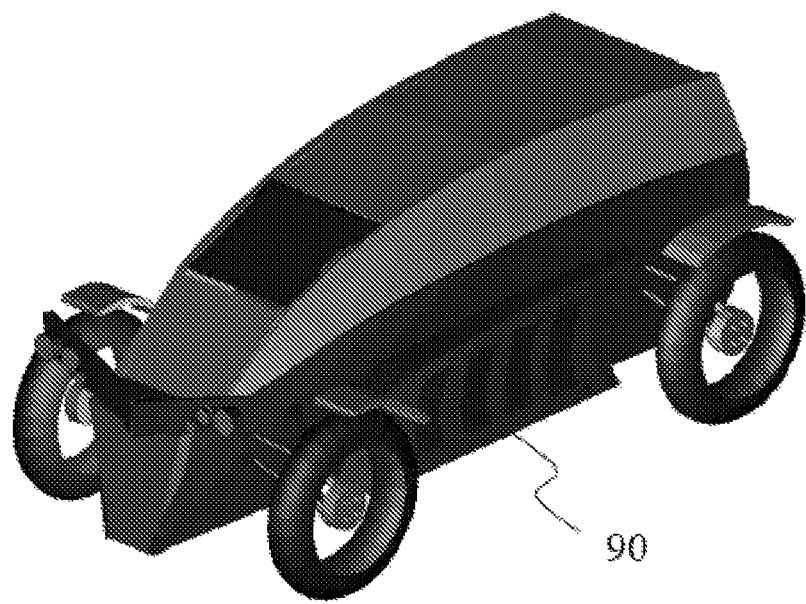
FIG. 2 is a 3-dimensional view of the entire lightweight, super efficient, safe and low-cost vehicle.

The advantages of the present invention are illustrated in the following example. Applying the presented design and human-factor constraints, a two-occupant. 4-wheeled vehicle using 25 inch diameter tires on a 44 inch wide spacing has total vehicle dimensions of 48 inches wide×80 inches long×44 inches tall (FIG. 2). The driver and passenger 74 are positioned in-line (tandem) to reduce the frontal area of the vehicle, thereby reducing aerodynamic drag.

Figure 3:
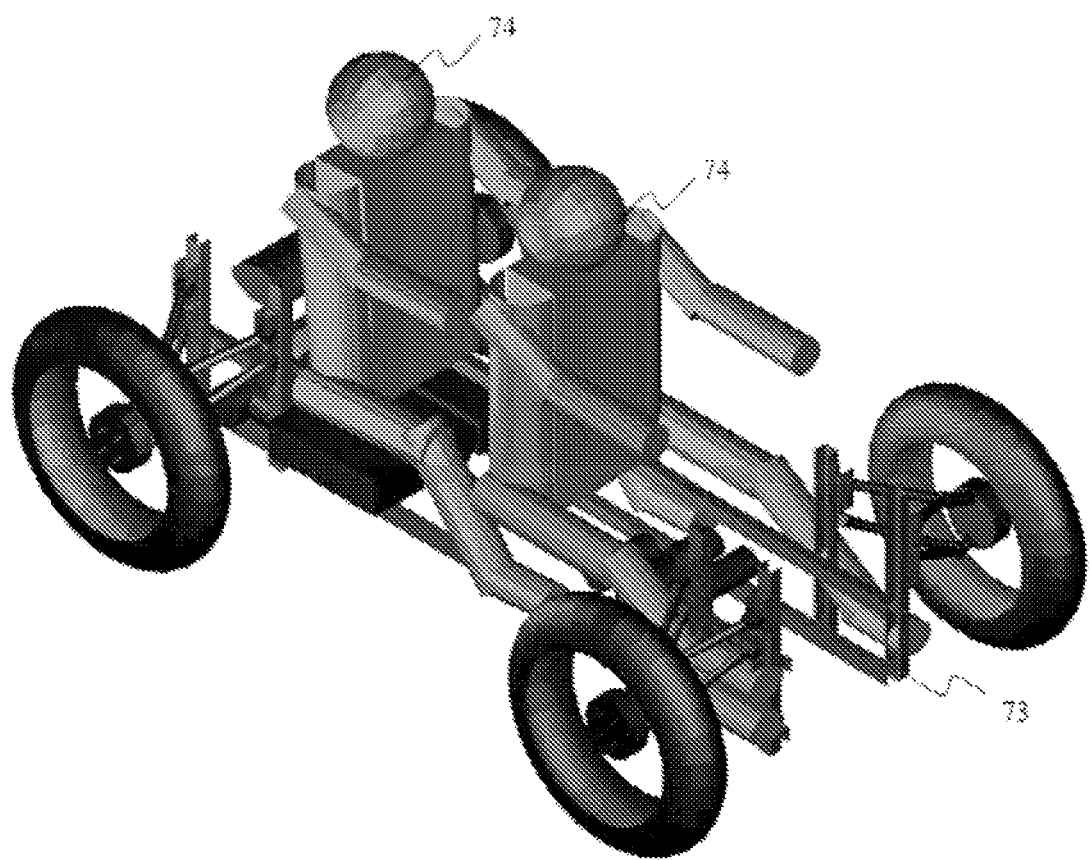
FIG. 3 describes an example frame for the vehicle, presented to demonstrate function and confirm the overall vehicle weight contention.

The vehicle's frame 73 (FIG. 3), supporting the contentions of the present design method, is constructed of structural steel members having a box-like section extending longitudinally from the front to the rear wheel control arm attachment points. Whereas there are many frame geometries which can achieve the desired goals, the example configuration 73 is constructed of 1.6 inch steel members, with 1.0 inch diameter control arms and modified spindles from an ATV (all-terrain vehicle) and served to validate the expected total frame weight of 89 pounds. A total weight of 760 pounds was obtained by the example prototype, with 205 pounds of un-sprung weight. Further optimization over the given example, such as use of composites in place of steel members, is obvious to those skilled in the art. As shown in the preferred embodiment of FIG. 2, a frontal area of 10.4 square feet is obtained. A vehicle of such proportion is easily capable of attaining a drag coefficient of 0.2, requiring 5 horsepower when operated at 65 miles per hour. Direct mechanical application of power to the wheels for this case (including driveline losses and accessories use) thus supports highway fuel economy in excess of 100 miles per gallon (mpg).

The reduced mass and frontal area of the present invention are seen to provide "interactive" benefit, i.e., lower vehicle mass and area lead to lower power requirement and therefore a smaller, lower mass powertrain constituents. In parallel, acceleration is more easily had through greatly reduced mass and area. The present invention elicits a combined city/highway efficiency exceeding 130 mpg, when complemented by suitable and currently available hybrid drive components.

Figure 4:
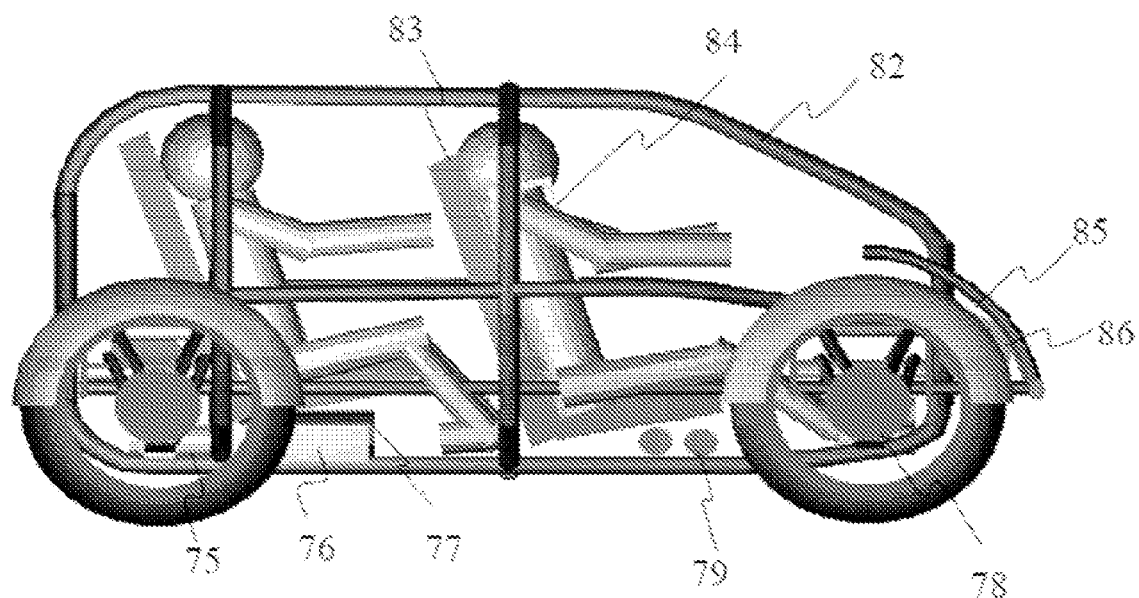
FIG. 4 illustrates the propulsion, rollcage and safety system components and location.

In reference to FIG. 4 example drivetrain components are: 18 horsepower diesel engine 75 consuming 298 gfkW-hr, 13 kW-95% efficient generator 76, hybrid control 77 with regenerative braking ability, 13 kW 95% efficient motors 78, and energy storage media 79. This hybrid propulsion system supports performance targets (0.5 g acceleration (3 second sustained), fuel economy in excess of 130 mpg) and is given here as its total weight of 240 pounds validates the system weight target. A further advantage of present invention is a low center-of-gravity, enabled by the reduced size of drivetrain components, and the design configuration (drive components easily located in the lower section of the vehicle).

Figure 5:
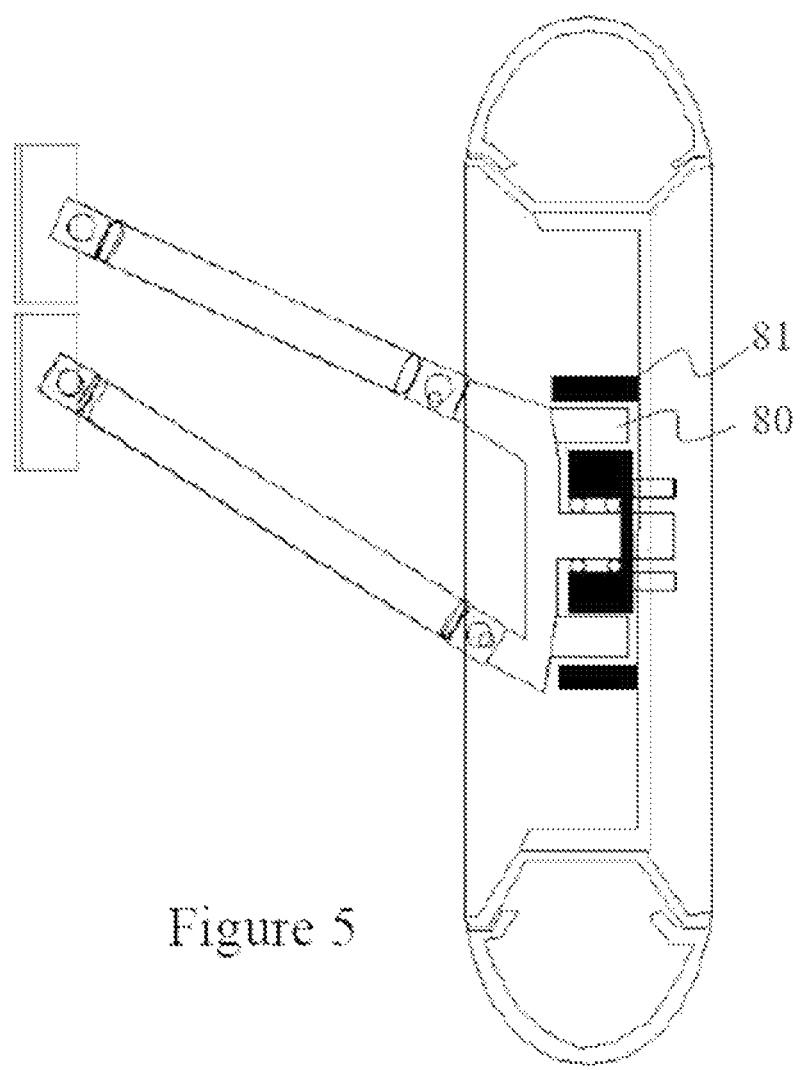
FIG. 5 describes an example wheel motor for the present invention

A special configuration of the presented invention includes the use of wheel motors in a serial hybrid drivetrain (FIG. 5). In such configuration, there exists no mechanical transmission or mechanical driveline-electrical power is simply transferred from a primary generator (combustion engine coupled to a generator, or a fuel cell) to the wheel motors via a controller. A general wheel motor is illustrated in FIG. 5—stator windings 80 and magnets 81 are integrated into the wheel structure. This integration reduces drivetrain weight addition to the vehicle and, in particular, the un-sprung weight. A further advantage is had by elimination of common brake components, enabled by regenerative braking. Supporting contention of the present invention, an example wheel motor added 15 net pounds at each driven wheel.

Illustrated in FIG. 4, a further feature of the present invention is a "safety rollcagen 82, providing rigid protection, and increased occupant control (effected by an automobile racing seat 83—FIG. 6, and racing style safety harness 84, FIG. 7) for increased safety. The highly rigid roll-cage with occupant control provides the continuous separation between the occupant and deforming components during collision. This approach leads to deflection of energy and vehicle masses, in contrast to energy absorption (crush) of the current automotive approach. Roll cage weight for the given example was 83 pounds (using 1.5 inch diameter, 0.058" racing compliant, alloy tubing), validating the total vehicle weight target.

A further feature of the present invention (reference FIG. 4) improves vehicle safety though the use of a structural member 85 positioned at the outer edge, and in front of each wheel, serving as the contact member that accommodates a wide variation in the structural bumper height of colliding vehicles (FIG. 4). Members 85 can be hinged so as to compress member 86, which is designed for compliancy and/or energy-absorption. The said member accommodates impacts from 12 inches to 26 inches, far exceeding the NHTSA standard 215 of 500 mm (20 inches) and 400 mm (16 inches). Continuous connection between left and right side members 85 provide this impact zone across the entire front of the vehicle.

Figure 8:
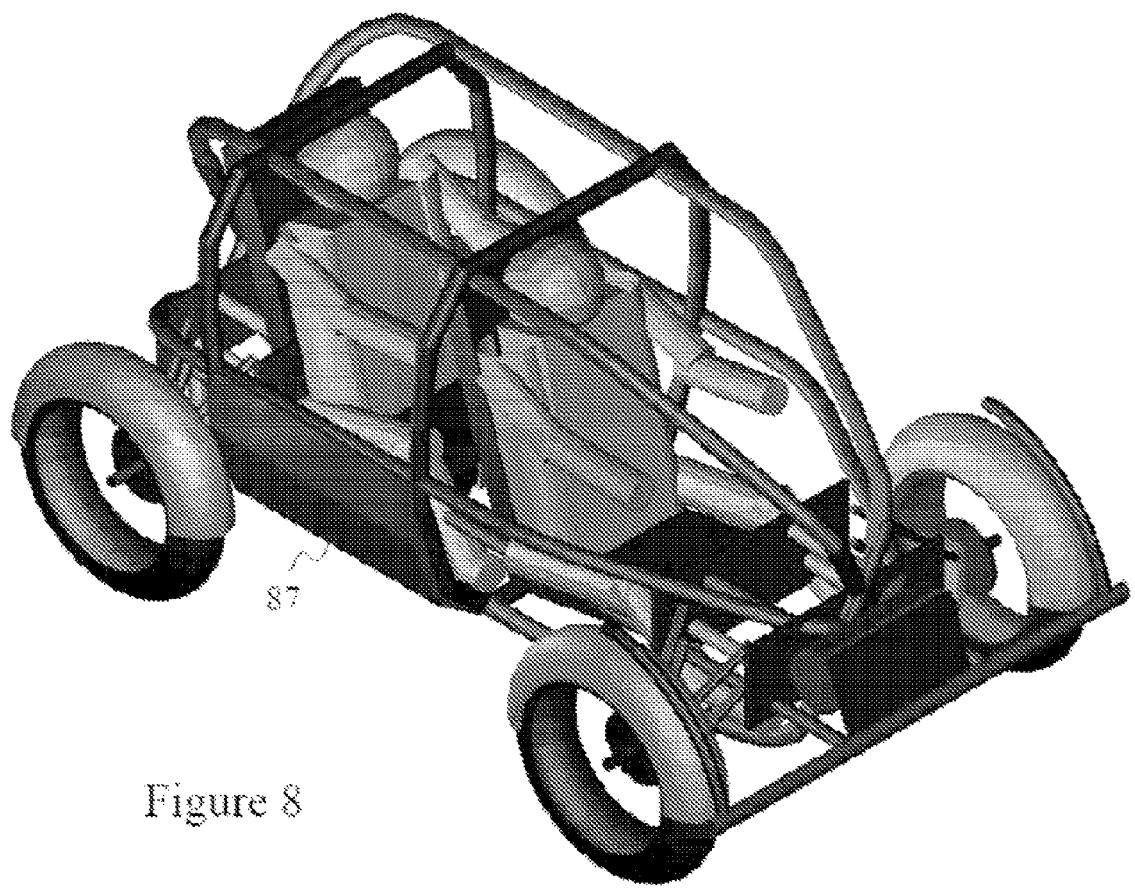
FIG. 8 is a 3-dimensional drawing of the vehicle with attached side panel
Figure 9:
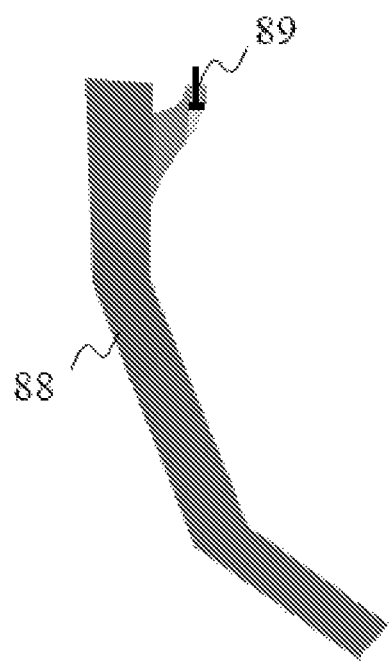
FIG. 9 is an end view of displaying an example attachment system of the side panel to the vehicle roll cage.

The present invention's use of a rollcage 82 for occupant protection and structural connection facilitates changes in vehicle external appearance and performance. Unlike the former body-integral approach, external panels 88 (FIGS. 8, 9) can be designed without regard to vehicle strength/stiffness, opening up a much wider degree of design flexibility, and greatly reducing the cost of new model creation. This approach further aids in repair costs, as elimination of the strength criteria avails external panel fastener options 89 (FIG. 9) leading to quick and low-cost replacements.

The presented design option of the present invention eliminates doors which compromise the integrity of the rollcage and incur added cost. Occupants enter and exit through side windows which can slide or lift to provide occupant entry and egress. A "side pod 90 facilitates occupant entry and egress, functioning as step (FIG. 2), as well as affording additional space for drivetrain and/or accessory systems.

Figure 11:
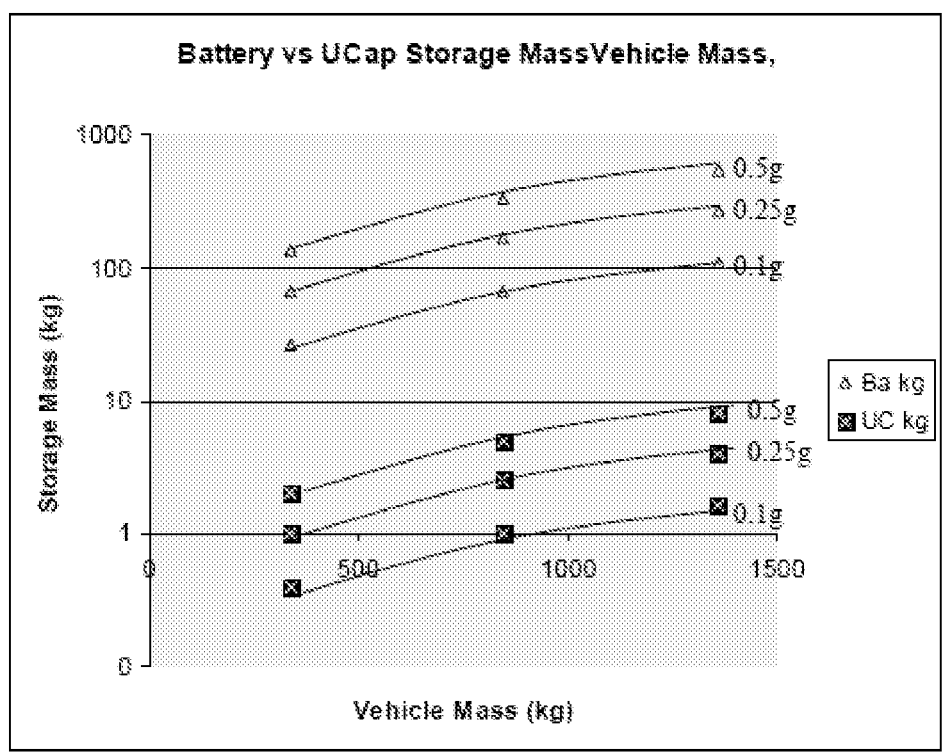
FIG. 11 relates the mass of storage required by battery and ultracapacitor storage solutions (based upon acceleration power), per vehicle mass and acceleration rate, for battery and ultracapacitor solutions.

In the preferred embodiment of the present invention, a low-mass and high efficiency, low mass hybrid drivetrain is employed, comprising a "short-cycle" methodology with high-power density storage, and with an option for thermal energy extraction from the ICE exhaust stream. In applying the presented power equation to city driving conditions (accelerating, constant velocity, constant velocity with grade climbing, constant velocity descending grade, braking and idling), maximum power rates are shown to be driven by the accelerating condition. FIG. 11 compares the mass of an advanced battery (100 W/kg per U.S. DOE 2005 data) vs. a commercially-available UC (6600 Wkg) required for a given vehicle mass and desired acceleration. Required storage mass is seen therein to increase with increasing vehicle mass and desired acceleration rates, with battery mass exceeding a UC solution by a full-order of magnitude for a given condition. The energy wasted in the moving of battery mass is significant. From FIG. 11, an acceleration capability of 0.3 g, results in the carrying of 100 kg of battery mass for a 338 kg mass vehicle, or roughly a third of the vehicle weight. This mass of battery would consume 600 W of energy when in steady-state motion at 35 miles-per-hour, negating opportunity to achieve superior fuel efficiency (note that higher vehicle weights render poorer results). Comparatively, a UC-based solution for the same parameters would weigh just 1.5 kg and consume 9 W of constant carrying power at 35 miles-per-hour.

Figure 12:
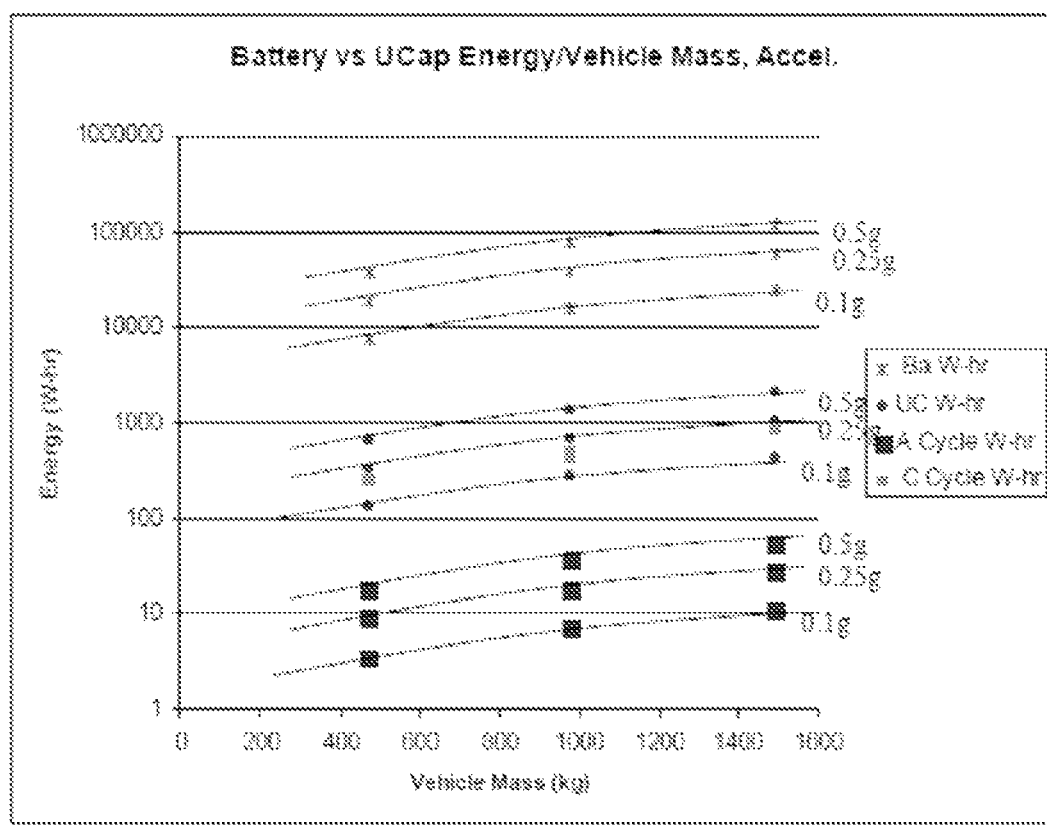
FIG. 12 displays the resulting stored energy as driven by the acceleration power requirements, and the acceleration cycle and combined "city cycle" energy, for battery and ultracapacitor solutions FIG. 13 describes the serial hybrid drivetrain components and connections

While power-driven UC storage mass requirements display a distinct advantage, the lower energy storage requirements place an additional constraint, which leads to the unique solution of the present invention. In FIG. 12 the required energy (W-hr) for the aforementioned city cycle (labeled by "C Cycle W-hr, consisting of 403 seconds, covering 5834 m) is plotted coincidentally with the energy provided by the power-driven design points of FIG. 11. For UCs, the energy requirements for an entire city cycle are seen therein to exceed the energy that would be provided if the design had considered power alone. Whereas the exceedingly higher mass and energy of the battery solutions driven by power requirements provide 30-150 city cycles of energy storage, the UC solutions can result in less than a single city cycle of energy storage. As the optimum (carrying least mass of storage) is approached, variable driving conditions require accommodation (such as a long grade followed by acceleration). This can be addressed by higher storage amounts, or by application of direct ICE shaft power (parallel hybrids) when storage is depleted. The latter requires an ICE capable of full power requirements, thus incurring added weight and associated carrying cost (fuel economy reduction).

Determination of energy storage requirements accounting for variable driving cycles brings forth further insight into the novelty of the present invention. For battery-based ESS systems, limited charge and discharge rate characteristics forced excessive amounts of energy storage, hence high mass of storage. In parallel hybrids this was dealt with by high mass storage or larger and heavier ICES and motors. The ability of UCs to receive and discharge power at rates 2 orders of magnitude higher than batteries enables a hybrid drivetrain to carry much less energy, and therefore much less mass.

Increased cycle lifetime of the energy storage medium becomes a further requirement that arises when designing for lower mass storage. Batteries typically exhibit 500 cycles until deteriorating to an 80% maximum recharge capacity level, whereas UCs display 0.5M-1 .OM cycles to this level. Designing for the small cycle life of batteries also results in extensive mass storage and associated carrying inefficiency.

Figure 13:
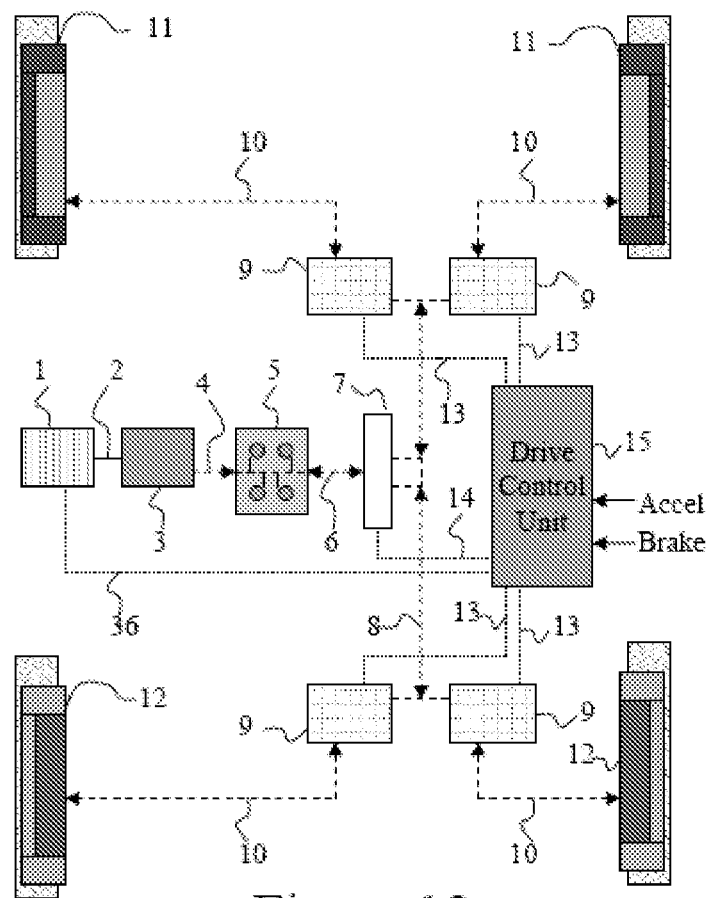

The preferred drivetrain to accompany the present invention embodies a serial hybrid drivetrain for a lightweight vehicle consisting of an ICE and directly-coupled generator serving power to electric motors that provide rotational power to the vehicle's wheels, and said generator alternately or in parallel providing power to restore energy to the ESS, with said ESS system configured to provide power directly to the said electric motors, with said ESS having a single energy storage medium of high power density (>1000 W/kg), and having a high cycle life (>500,000 cycles to a deteriorated state of 80% capacity recharge level), and accepting charge rates of the maximum of charge rates from the ICE/generator and/or regenerative braking from the electric motors, and the sizing and charge/discharge efficiency of said ESS system such that excess storage and corresponding wasted "carrying" energy is minimized, and said serial hybrid drivetrain operated by a compatible control system which operates the engine at its peak efficiency point (FIG. 13). Under the stated constraints of low vehicle mass, high power density and minimized energy storage, higher vehicle fuel efficiency is obtained, with a resulting shorter duration, higher-frequency of on and off cycling (herein labeled "short cycling") of the ICE and depletion/replenishment of the ESS than is obtained with current low density storage mediums (batteries for example) and their combinations with high density mediums. Future storage mediums which exhibit the qualities now only attributable to UCs would be amenable to this prescribed invention methodology.

In the preferred embodiment of the present invention high efficiency (>95% efficiency units are currently available) brushless DC motors (also be referred to as AC synchronous motors driven at variable frequency via DC-AC motor controller) drive the wheels. As displayed in FIG. 13, the motors may be located in the wheel housing (called a wheel-motor) thus eliminating mechanical drive shaft and differential components. Operated via a motor controller having "4-quadrant" control, the brushless DC motors and controllers permit the capture of regenerative braking energy to flow hack to the ESS.

Figure 14:
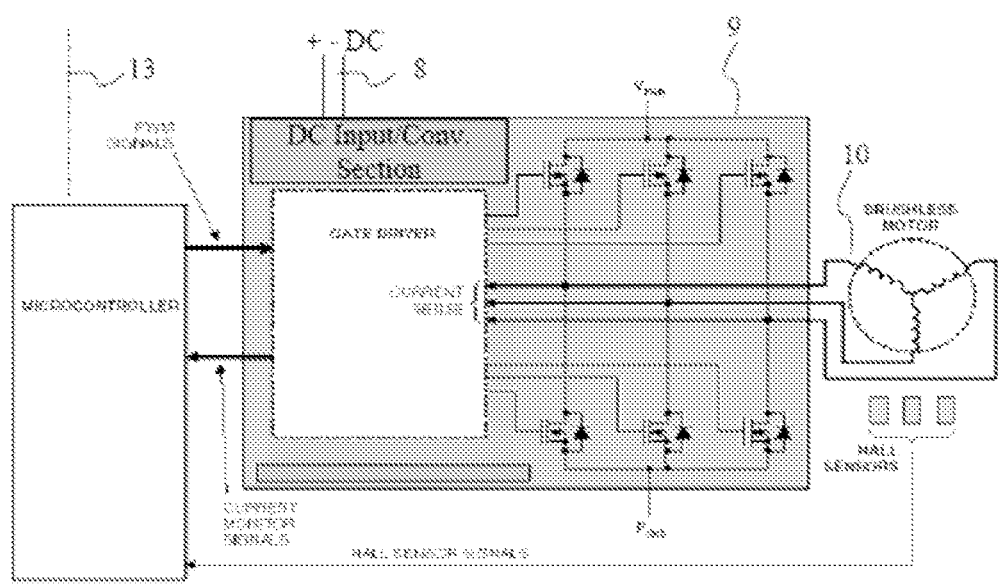
FIG. 14 illustrates an example motor controller (brushless DC illustrated)

In the preferred embodiment of the present invention (reference FIG. 13), an ICE 1 drives a high efficiency generator 3 via a shaft 2 which delivers DC power to the UC storage 5 via electrical connections 4. Sequencing (on/off, durations) of the ICE 1 is controlled by the drive control system 15 via connection 36. The ESS control system 7 controls power flow between the UCS 5 via connection 6 and the loads (4 quadrant brushless DC motor controllers 9) via connection 8. A micro controller within the brushless DC motor controller creates PWM (pulse width modulated) signals to gate drivers which in turn pulse high current transistors that in turn provide the multi-phased, pulsed power to the DC brushless motors 11 and 12 via connection 10 (FIG. 14). Control of the brushless DC motor controllers is provided via connection 14 to the Drive Control Unit 15. Under braking signal from the vehicle driver, the drive frequency is decreased below that of the rotating motors 11 and 12, inducing reverse current flow which is then converted back to DC power and fed onto the UCS 5.

Figure 15:
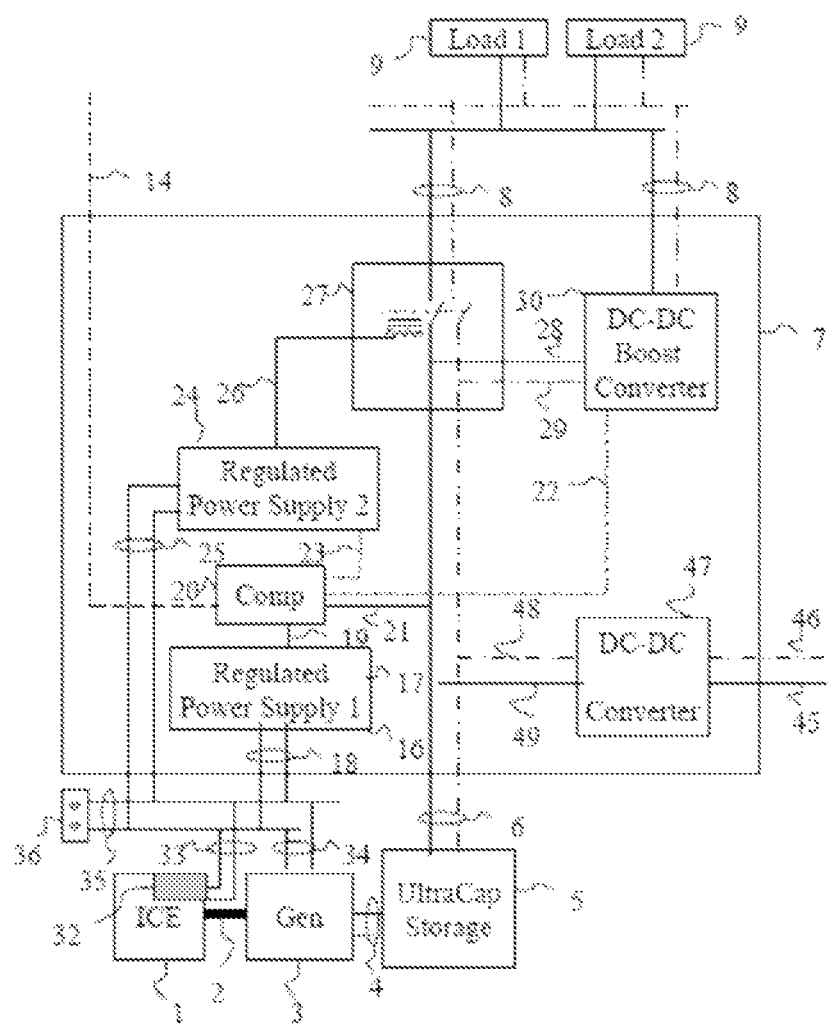
FIG. 15 is a schematic of the ESS control system with heat recovery input

Control of the ESS system is described in FIG. 15. The Comparator Circuit 20 monitors the high voltage side of the bus via connector 21. When the feed bus high voltage falls beneath a threshold value the Comparator 20 releases the inhibit signal line 22 inducing the on-state of the DC-DC Boost Converter 30. Bus Connections 28,29 supply power to the DC-DC Converter 30 which is connected to common terminals of the Contactor 27. Contactor 27 is in a normally-closed condition when the UCS bus 6 voltage is above the low-voltage threshold previously described. Under low voltage conditions, Comparator 20 releases an inhibit release signal via connection line 23 to a regulated supply 24 which energizes the coil of Contactor 27, thus directing all power flow from the UCS 5 to the DC-DC Converter 30 for up-conversion to the requisite output voltage required by the load. Connection lines 8 (from the Contactor 27) direct power to the common load bus under the NC state of Contactor 27, whereas power is directed via connection lines 8 from the DC-DC Converter output under the case of low UCS bus voltage. A delay corresponding to the known response time of the DC-DC converter ensures that opening of Contactor 27 connection to the output bus lines 6 does not cause momentary sagging of the ESS output voltage (alternative control designs may equivalently serve to ensure smooth operation of the ESS output bus during switching). A Regulated Power Supply 17 is connected to the battery bus via connection lines 18, to provide controlled, logic level power supply to the Comparator 20. Regulated Power Supply 24 provides a controlled DC level to operate the coil in Contactor 27, also supplied by the battery 36. Starting of the ICE 1 is accomplished by an electric starter motor 32. A 12VDC battery 36 has as its sole function to provide power to the starter motor 32, and control circuits within the ESS control system 7 and Drive Control Unit 15. The battery 32 capacity is maintained by a separately regulated output from the generator 3 via connection lines 34.

Figure 16:
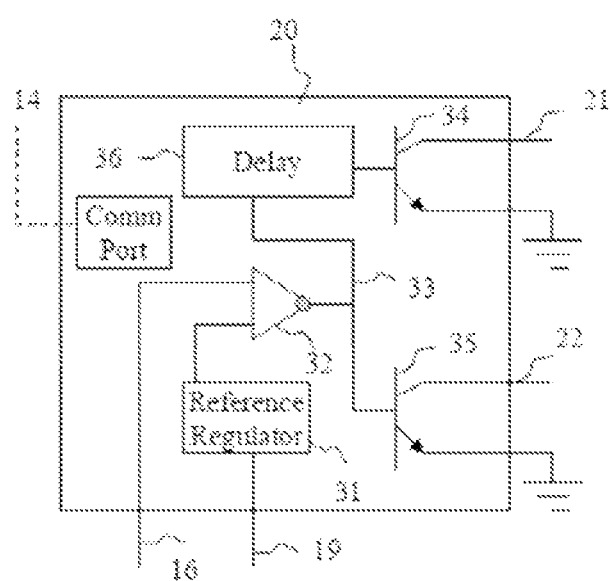
FIG. 16 is a schematic of the comparator circuit of the ESS control system

FIG. 16 displays the Comparator Circuit 20 wherein connection line 19 receives regulated power from Regulated Power Supply 17, delivering controlled logic-level voltage as reference input to the low-side of the Comparator 37 via the Reference Regulator 31. Connection line 21 provides the voltage sense input to the Comparator 37 from UCS bus 6. When the difference between the Comparator 37 inputs falls beneath the threshold value, connection line 38 energizes Power Transistor 41 sending the inhibit release signal to the DC-DC Converter 30 via connection line 22. Connection line 38 also activates the Delay 39 which activates Power Transistor 40 (after its prescribed delay, or similar control function) which, via connection line 23 enables Regulated Power Supply 24, which then powers the coil in the Contactor 27 via connection line 26.

Figure 17:
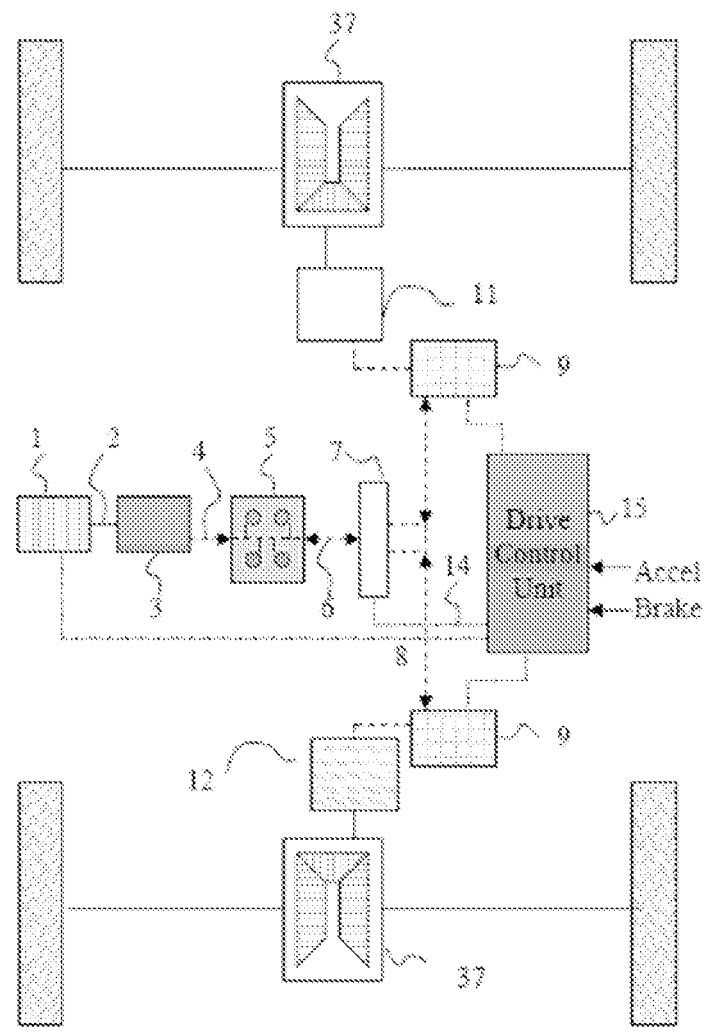
FIG. 17 illustrates a variant of the invention, utilizing alternative motors 10, 11 to achieve different speed/torque capabilities in a 4 wheel drivetrain (without a transmission or mechanical coupling mechanism).
Figure 18:
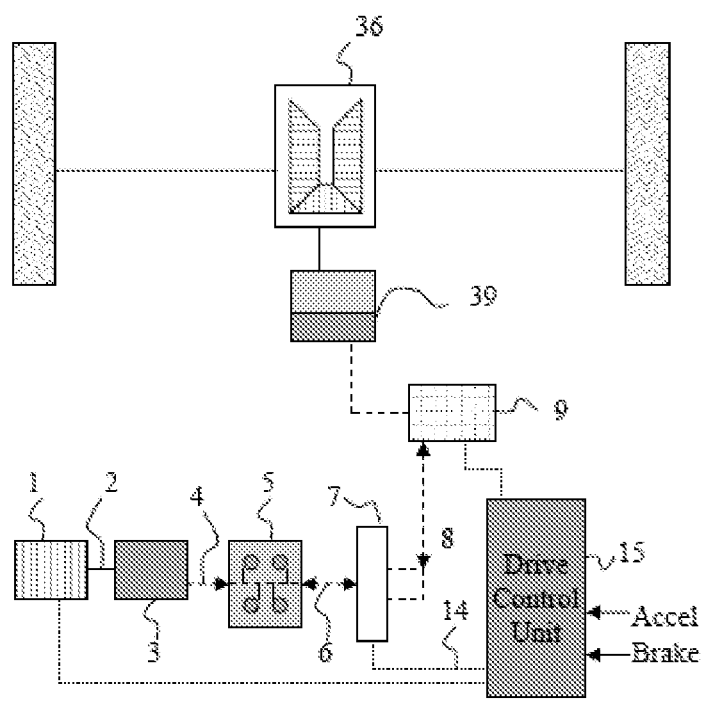
FIG. 18 illustrates a variant of the invention, utilizing a dual-winding within a single motor 44 to achieve different speed/torque capabilities in a 2 wheel drivetrain (without a transmission or mechanical coupling mechanism).
Figure 19:
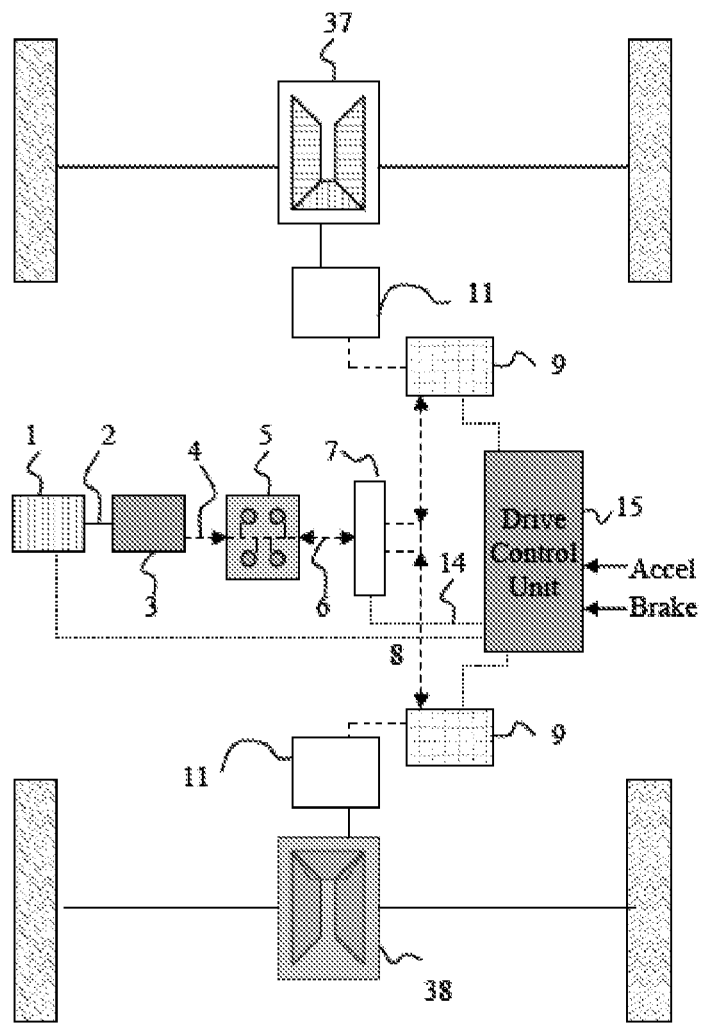
FIG. 19 illustrates a variant of the invention, utilizing differentials 42, 43 with different, yet fixed gear ratios to achieve different speed/torque capabilities in a 4 wheel drivetrain (without a transmission or mechanical coupling mechanism).

Securing the advantage of mechanical transmission and decoupling mechanism elimination requires attention to high starting torque and maximum motor speed requirements. In addition to the configuration of FIG. 13 (wheel-motors of differing torque/speed characteristic, front/rear), configurations using differently wound motors (one wound for high-torque, one for high-speed-FIG. 17), use of dual-windings within the same motor (one winding for high-torque, one for high-speed-FIG. 18), and use of differentials having different gear ratios (FIG. 19). Alternative combinations are obvious to the observer, including 2 and 4 wheel drive options. While incurring additional cost, the driving of all vehicle wheels with motors enables higher capture of regenerative braking energy.

A serial hybrid drivetrain represents one application benefiting from the prescribed apparatus, and serves to illustrate component types, requirements and advantages and feasibility of the apparatus. In this case, there exist varying, and high current demands to and from the motor-generators which drive the vehicle wheels. In one example where system weight and efficiency are of high priority, a lightweight and high charge/discharge rate, and high efficiency of energy transfer, the prescribed UCS-based ESS apparatus is particular advantage. An example system design, has a DC generator as its DC Source 1. In an example case of a 48V system bus, a single Maxwell BMOD00165-E048 Ultracapacitor provides 50 Watt-hr of capacity, a discharge rate maximum of 93 kW and maximum short circuit current of 4800 Amps. A Curtis Albright SW1000A DC contactor affords 1000 A expected maximum application requirements, and consumes 30 W of coil power when activated. American Power Design's H30 DC-DC converter supplies the Contactor coil power over the wide range of input voltage. A Dallas Semiconductor Max5090A affords regulated 3.3V power to the National Semiconductor LM139 comparator over an input voltage range of 6.5 to 76V. A Logic-level, 5V signal from LM139 drives power transistor VN02NSP by STMicroelectronics, enabling the DC-DC converter 24 and the delay 26.

A typical 48V brushless DC motor having 95% efficiency and a controller of similar efficiency exhibits a functional input range of 40 to 50 VDC and exhibits combined efficiency of 90%. When applied to single unit of the described UC, the UC output would be below the useable range of the motor controller in 1 second, when drawing at a 500 amp rate. Utilizing the prescribed apparatus of this invention and using available high-efficiency DC-DC converter technology having a 2:1 input range from 20-40 Volts, 500 amps could be then drawn for 5 additional seconds, an increase of 500%. The use of the upconversion device in only the lower voltage or state-of-charge condition averts the upconversion loss when not required. When such a system is in regenerative mode, the vehicle application controller signals the Comparator Circuit, closing the Contactor enabling reverse energy flow to the UCS. This all-UC based design permits full-rate regenerative braking energy flow from the wheel motor-generators, where other designs either waste the excess energy in heat, or require additional storage. In operational cases where the UCS is currently at a full SOC, additional UCS storage would also be required when regenerative braking energy becomes available, however, this is accommodated in design with a larger UCS system in the prescribed apparatus, and is more efficient in energy transfer and weight than a combined battery system, translating to higher vehicle efficiency.

Figure 6:
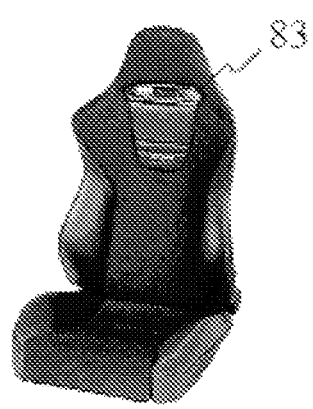
FIG. 6 is a picture of a high-restraint occupant seat
Figure 7:
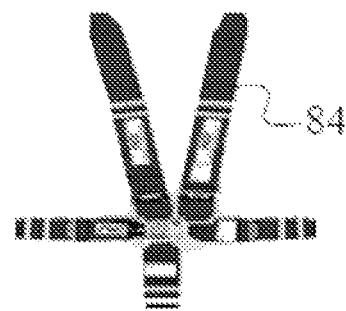
FIG. 7 is a picture of a high-restraint safety belt system
Figure 20:
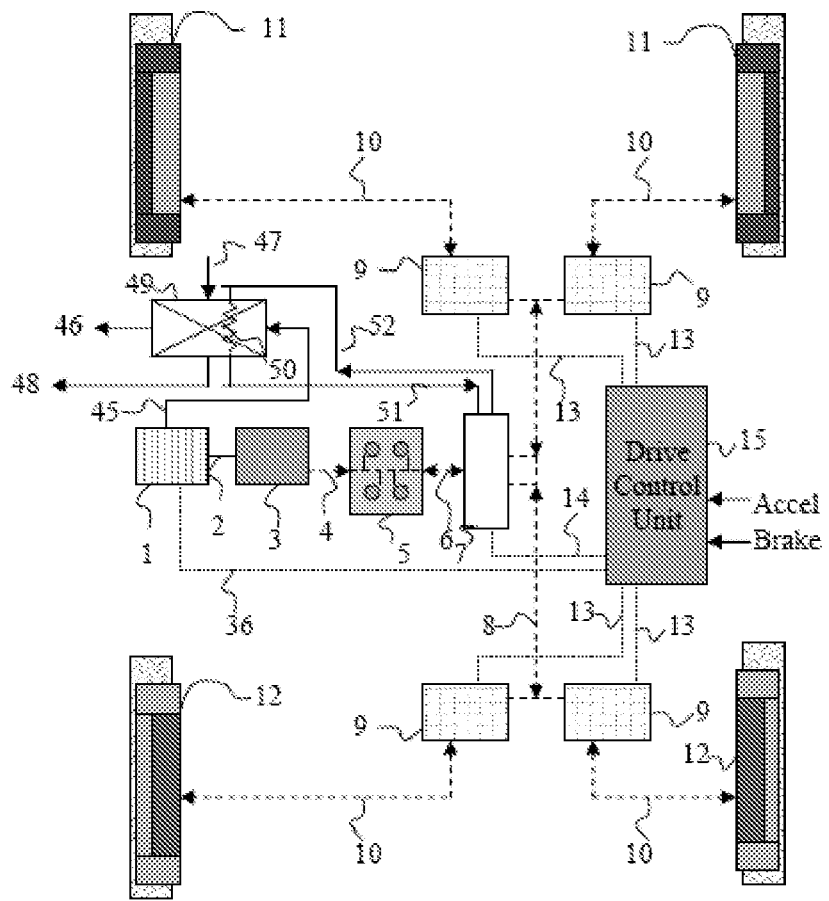
FIG. 20 is a schematic of a hybrid vehicle drivetrain and control system with exhaust heat energy recover
Figure 21:
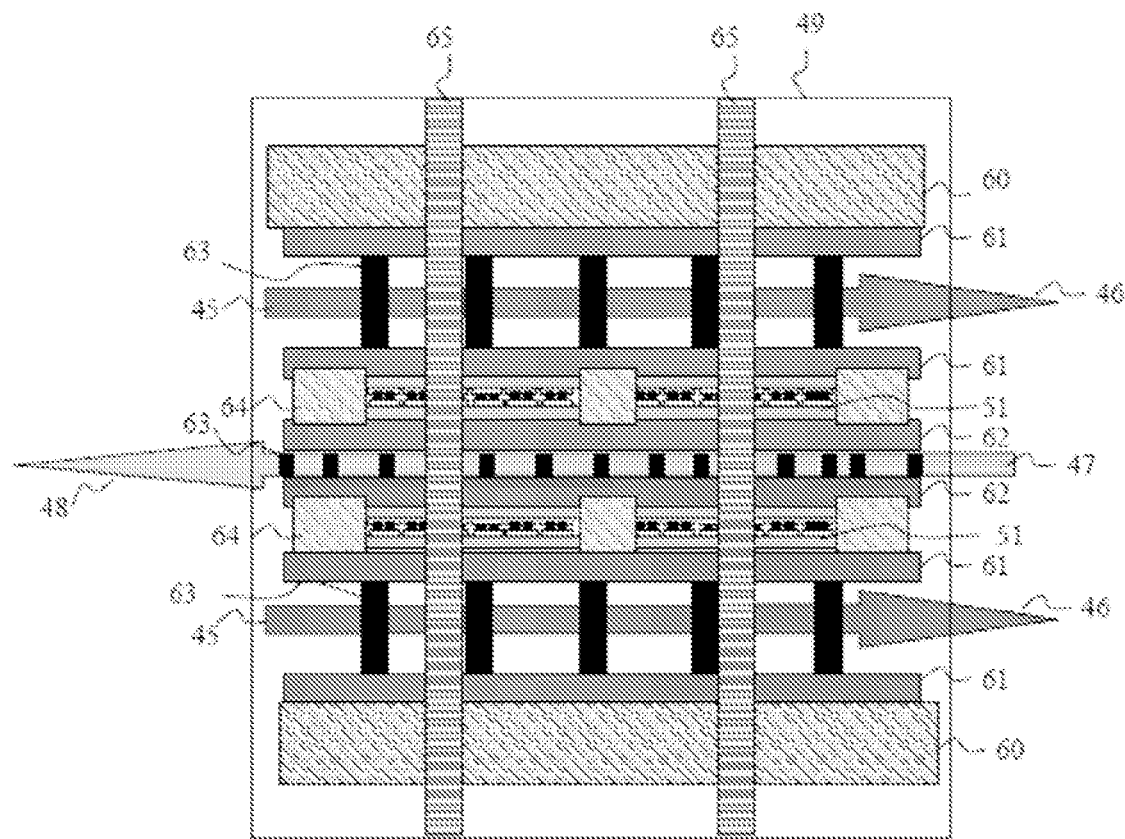
FIG. 21 is a crossectional view of the waste heat-to-electric conversion system
Figure 22:
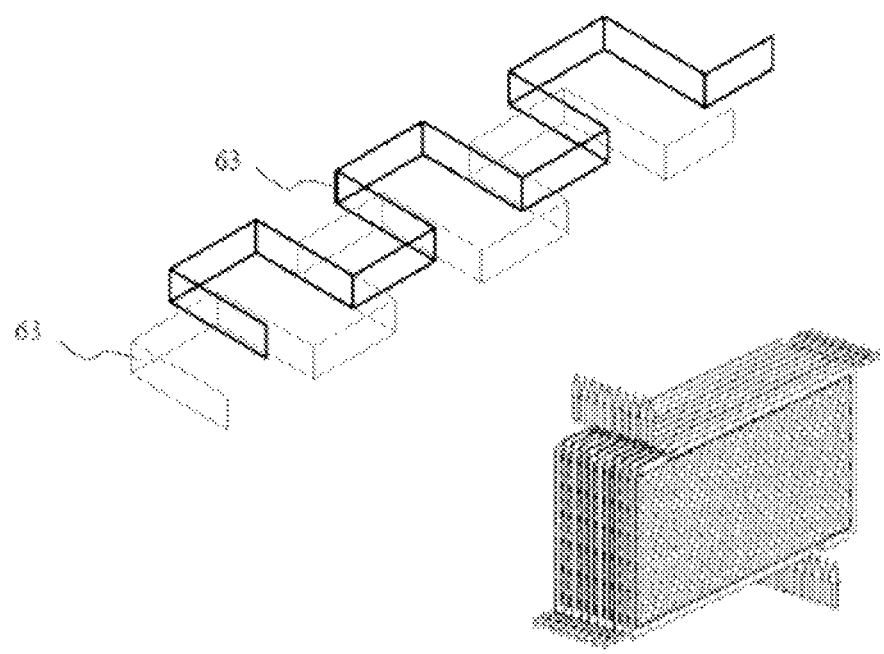
FIG. 22 illustrates the fin construction of the conversion system and the stacking of heat exchange layers into a complete unit

In the preferred embodiment of the invention, the waste heat-to-electric conversion system 49 shown in FIGS. 20, 21 and 22 comprising hot fluid and cold fluid passages formed by plates 61 and alternating and fastened "fins" 63 which mechanically interconnect the plates 61 and provide extended heat transfer surface area, heat-to-electric modules (thermoelectric or thermionic, hereafter referred to as thermoelectric modules) which are held in thermal contact with hot and cold side plates in a stacked arrangement by mechanical fastening such as bolts 61 or other mechanical fastening means, insulation 64 to reduce heat transfer other than through the thermoelectric modules 51, and insulation 61 to reduce heat transfer from the outer channel to the ambient environment, generates electricity. Hot exhaust stream flow is ducted into, and out of, the conversion system 49 by manifolds 45 and 46 respectively. The circuitous exhaust stream flow path in the conversion system 49 also serves to dissipate exhaust stream audible noise (similar to a muffler). Fin stock is commonly obtained in bent form via large area forming dies and assembled with the plates to form a completed structure or subassembly as shown in FIG. 6. Coolant flow is ducted into the conversion system 49 by manifolds 47 and 48.

For the given case of the present invention, a 100 mile-per-gallon, 338 kg vehicle having an 18 hp (13.4 kW) diesel engine has an exhaust temperature is 400° C. Ducted air, having a maximum temperature of 70° C. is used as the coolant, and is extracted from the vehicle exterior to maintain the cold side temperature of the thermoelectric modules. For corrosion resistance, carbon steel is the selected construction material for exhaust stream-side plate and fin material 63 (FIG. 22) having a mean thermal conductivity of 47 W/m° K. Thermal analysis and geometrical optimization of compact heat exchangers are provided in heat transfer texts (reference xx) as:

$$Q = U \times A \times LMTD$$

Where
Q=total heat exchanged
U=overall heat transfer coefficient
A=exchanger surface area
LMTD=log mean temperature difference $$LMTD = \left(\frac{GTD - LTD}{\ln(GTD/LTD)}\right) \times CF$$

Where: GTD=larger of (T1−t2) or (T2−t1)
LTD=smaller of (T2−t1) or (T1−t2)
And fin geometries optimized by:
$h = (J//t)^{0.66} \times (0.323) \times (D \times V \times L/Dv)^{0.5} \times D \times C_p \times J$ Where:
h=Heat transfer coefficient
J=Velocity of the air past the fin
D=Air density
L=Length of the cooled surface in the direction of air flow
$D_v$=Dynamic viscosity
t=Thickness of the boundary layer
$C_p$=specific heat of the cooling air For the given condition, and in a counter-flow configuration (hot and cold fluids flow in opposing directions) an LMTD of 208° C. is obtained giving rise to 0.2 square meter of transfer area required using 1 millimeter thick plate material. Design considerations of exhaust back pressure (impact on ICE performance), fluid pumping power, and thermoelectric module area impact final design of channel size and number of channels. In the presented case, thermoelectric module size requirements drive the areal dimensions, per the following prescription.

Figure 23:
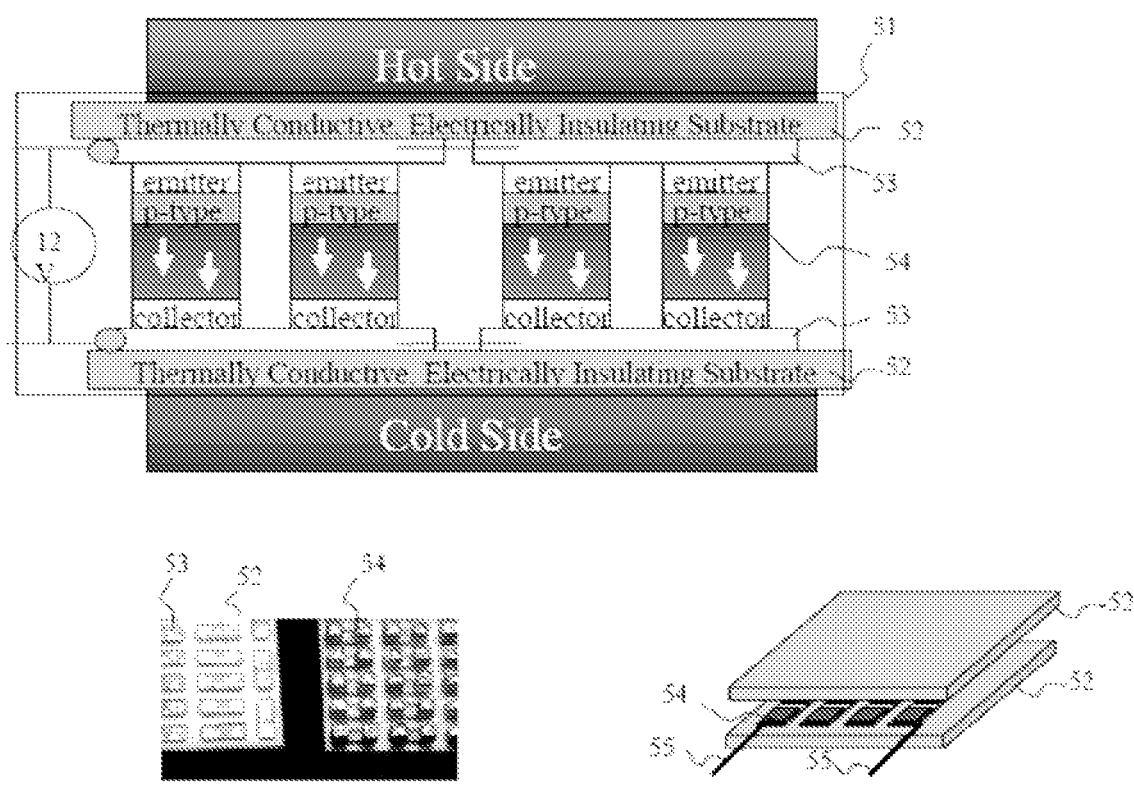
FIG. 23 illustrates the thermal-to-electric conversion module construction FIG. 24 (by tire manufacturer Bridgestone) illustrates the extremely limited cambering capability of automobile tires versus the constant-radius type used by the present invention FIG. 25 demonstrates the graphical method to determine roll center, and the preferred location of the roll center above the center-of-gravity to induce the desired body and wheel cambering motion.

Heat-to-Electricity conversion is performed by thermoelectric modules 51 as displayed in FIG. 23 comprising individual thermoelectric devices 54 which are exposed to hot and cold surfaces on opposite sides through electrically-isolating and thermally conducting substrates 52. The individual thermoelectric devices 54 are electrically-interconnected by a conductive pattern 53 applied to substrates 52. An interconnection system 55 connects the multiplicity of modules 51 and carries the summary power to the ESS control system 7 (FIG. 20).

Illustrated in FIG. 23, advanced thermal diodes (reference U.S. Pat. No. 6,796,191) providing thermal conversion efficiency of 20% are of 2 square millimeters in area, and deliver 10 amps per a 2 diode stack, developing 80 mV when subjected to the stated thermal difference. A 12V module of dimension 30 mm×30 mm, delivers 120 Watts via a series connection of 150 diode stacks. 32 total modules connected serially in groups of 4 to provide 48V output and the groups then connected in parallel, provide extraction of 3.75 kW from the exhaust waste heat stream from the stated engine. Aluminum nitride of 1 mm thickness is the substrate material (thermally conductive, electrically insulating). Module construction consists of substrate metallization and patterning, solder pre-form, diode placement and reflow. The modules are set into metallized (for oxidation control) locating recesses, in an array of 4×4 in the carbon steel plates, thus requiring 2 layers of modules as shown in FIG. 23. Refractory fiber high temperature insulation (thermal conductivity of 0.7 BTU-in./Hr. Ft2 OF in sheet form by Cotronics) surrounds the perimeter of modules to avert heat transfer other than through the thermoelectric modules (FIG. 21).

Figure 24:
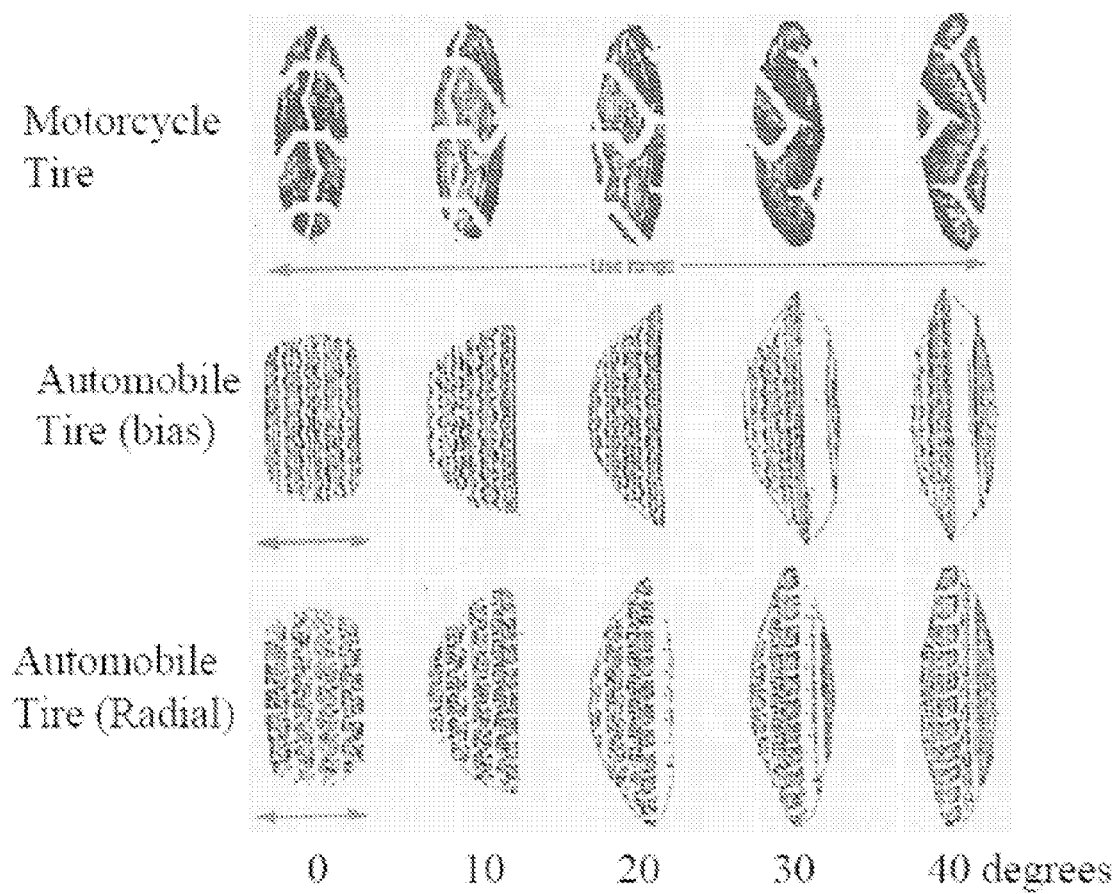

Special Configuration: (Leaning, Lightweight 4-Wheeled Vehicle):

In a special configuration of the present invention, the use of a motorcycle tire affords the unique capability to lean (or "camber") the entire vehicle. The maximum camber angle for a conventional automobile tire is 5 degrees, whereas a motorcycle-style tire having continuous radius is comfortably cambered up to 50 degrees (FIG. 24).

Figure 25:
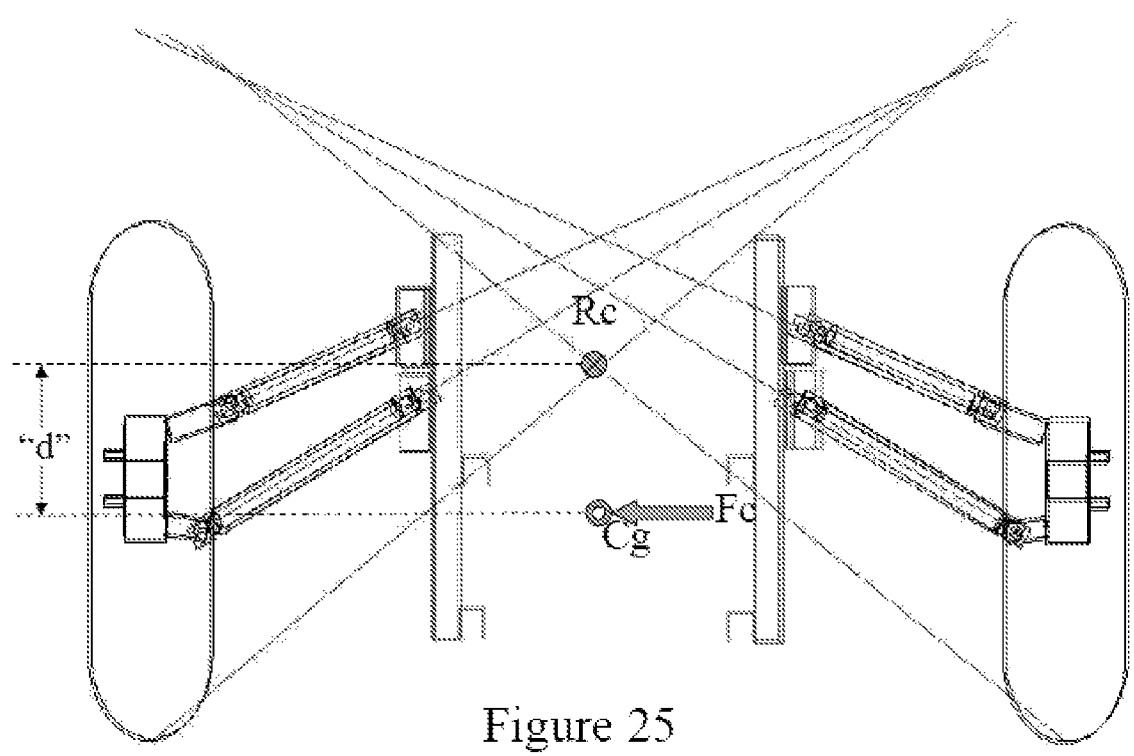
Figure 26:
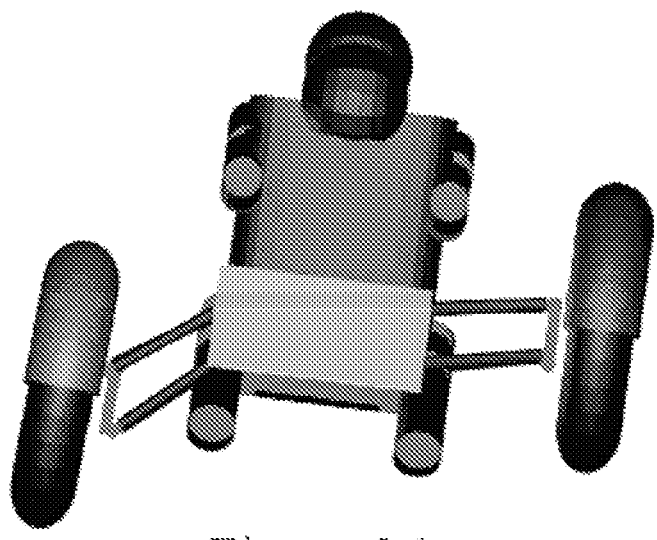
FIG. 26 is a front view of the suspension, frame and occupants in the cambered position

A typical automobile suspension is designed to minimize body roll, as their configuration causes the undesirable action of rolling outward (top of vehicle tilting outward) from the corner. In this special configuration of the present invention, body roll is facilitated, with leaning occurring inward to the corner (top tilting to inside of corner), similar to the action of many wheeled vehicles (bicycles, motorcycles, scooters, skateboards, etc.). In this unique configuration of the present invention, a 4-wheeled vehicle has a single-sided, upper and lower control arm arrangement in which the suspension "roll-center" is designed to be above the vehicle's center-of-gravity (Cg). The roll-center (Rc) is a geometrically-determined point about which the vehicle body rolls, shown in FIG. 25. When in cornering action, centripetal force (Fc) acts through the vehicle's Cg and imparts a torque (equal to Fc times distance "d) causing the desired body and wheel rotation. Thus a passive, naturally-leaning (no operator action required, no active machinery involved), 4-wheeled vehicle is presented by this design. Additionally, the vehicle will naturally lean on an inclined plane under gravitational forces (FIG. 26). In the preferred embodiment of the special configuration, the design of the naturally leaning suspension is made such that the center-of-gravity is made to lower as the vehicle leans.

In the preferred embodiment of the special configuration for a two passenger vehicle, the driver and passenger seats are positioned in-line (tandem) to avert asymmetric loading when the passenger seat is empty.

Herein, the invention has been described with reference to specific embodiments, however, modifications and variations of the invention may be constructed without departing from the scope of the invention as it is defined in the following claims.

In summary, the present invention employs the unique use of low-mass and large diameter, constant radius (motorcycle) tires to enable a much lower weight four-wheeled vehicle, therein providing the pathway to higher he1 efficiency and maintaining good ride characteristics. When the methodology is employed with in-line seating, low aerodynamic drag force is achieved. Marketable safety level of the invention is achieved using a rollcage, operator restraints and a compatible height bumper system. Removable panels facilitate alteration of the vehicle appearance. Entry and egress is provided without the use of doors, furthering enhanced safety, and reduced weight and cost. A side pod facilitates entry and egress. The use of large-diameter, constant-radius tires and lightweight wheels and the suspension design additionally enables simultaneous and natural (operator-free) cambering (leaning) of the structure and the wheels toward the inside corner while under the action of centripetal (while cornering) or gravitational (while on an inclined plane) forces. Propelling of the stated vehicle with a low-mass, serial hybrid drivetrain having a minimized mass of high-power density electrical storage medium, and control system to extract a large portion of the storage capacity enables superior he1 efficiency. Fuel efficiency is furthered by conversion of waste exhaust heat energy into electricity. Vehicle cost is reduced through elimination of transmission and mechanical de-coupling mechanisms, reduced vehicle size and corresponding drivetrain system size, and reduced energy storage.

It is obvious to those skilled in the art that many variations of the present invention are enabled. Herein, the invention has been described with reference to specific embodiments, however, modifications and variations of the invention may be constructed without departing from the scope of the invention as it is defined in the following claims.

The invention claimed is:

1. A four-wheeled vehicle that achieves a total gross vehicle weight of 1,500 lbs. (680 kg) or less, wherein each tire has a continuous radius (a motorcycle-style tire and wheel) and has an outside diameter of twenty to twenty-six inches and has a width of three to eight inches, with said wheels connected to the vehicle's frame by a single-sided support arm, the vehicle employing a thermal-to-electrical conversion system extracting heat energy from an exhaust stream of an internal combustion engine and supplying said energy, in electrical form, to an energy storage system comprising:
   thermal-to-electrical conversion modules having thermal-to-electrical conversion devices attached and interconnected between two opposing planar substrates via a metallization pattern, with said substrates being thermally-conductive and electrically-isolating,
   a planar heat exchange system consisting of isolated hot and cold stream channels, with said channels inclusive of extended surface area, having the outside of said channels in contact with the said modules,
   a system electrically connecting said modules with a DC-DC Conversion device for energy transfer to an energy storage system.

2. A four-wheeled vehicle that achieves a total gross vehicle weight of 1,500 lbs. (680 kg) or less, wherein each tire has a continuous radius (a motorcycle-style tire and wheel) and has an outside diameter of twenty to twenty-six inches and has a width of three to eight inches, with said wheels connected to the vehicle's frame by a single-sided support arm, the vehicle of less than 680 kg mass employing a "short-cycling" serial hybrid drive comprising:
   an internal combustion engine mechanically coupled to a generator,
   an energy store system receiving power from said generator and power from regenerative braking, having a storage medium of high charge and discharge rate capability (>2000 W/kg), high charge and discharge efficiency (>90%) and high cycle lifetime (>500K cycles from 0 to 80% charge capacity), with said storage capacity (Watt-hours) less than 200 times that of a single acceleration event of the vehicle from 0-35 miles-per-hour,
   an energy control system capable of depleting greater than 66% of the total stored energy capacity,
   at least one motor controller and associated motor providing torque to one or more of wheels of said vehicle and which receive power from the energy store system and/or the generator, with said motor and controller transferring regenerative braking power to the energy store system under vehicle braking condition.

3. The vehicle of claim 2 further comprising:
   an up-conversion device providing voltage increase from input to its output terminals, a switching device enabling passage of the said combined storage output power directly to the external load bus, or to the up-conversion device, said up-conversion device having its output directed onto the external load bus, a system to control the operation of said switching device, a method of directly coupling said storage elements to the system load bus for direct power transfer from said storage components to the system load bus when the storage component voltage or state-of-charge is above a determined level, and then diverting the power flow from said storage components to an up-converting device to extract the remaining energy from the storage components when the said voltage is below said condition.

4. The vehicle of claim 2 further comprising:
   a solid-state thermal-to-electrical conversion system extracting heat energy from an internal combustion engines exhaust stream and supplying said energy, in electrical form, to an energy storage system to said energy storage system.

5. The vehicle of claim 2 further comprising:
   a solid-state thermal-to-electrical conversion system extracting heat energy from an internal combustion engines exhaust stream and supplying said energy, in electrical form, to an energy storage system comprising:
   thermal-to-electrical conversion modules having thermal-to-electrical conversion devices attached and interconnected between 2 opposing planar substrates via a metallization pattern, with said substrates being thermally-conductive and electrically-isolating,
   a planar heat exchange system consisting of isolated hot and cold stream channels, with said channels inclusive of extended surface area, having the outside of said channels in contact with the said modules,
a system electrically connecting said modules with a DC-DC Conversion device for energy transfer to an energy storage system.

6. A vehicle comprising:
   four wheels, wherein each wheel is centered within a motorcycle-style tire,
      wherein each motorcycle-style tire has a continuous radius profile and continuous tread sidewall,
      wherein each wheel is connected to a vehicle frame by a single-sided support arm,
      wherein the vehicle has a suspension roll-center which is above the center of gravity of the vehicle, and
      wherein the vehicle cambers while cornering.

7. The vehicle of claim 6, wherein the motorcycle-style tire has an outside diameter between twenty and twenty six inches and is connected to the frame of the vehicle by a single-sided support arm.

8. The vehicle of claim 7, wherein the motorcycle-style tire has a width of between three and eight inches.

9. The vehicle of claim 6, wherein the vehicle cambers while cornering based on at least centripetal force.

10. The vehicle of claim 6, wherein the vehicle is configured to camber when under a gravitational force on a inclined plane, the cambering defined as tires and wheels enabled to camber greater than 6 degrees and the main body rotation exceeding 3 degrees when the vehicle is under gravitational forces.

11. The vehicle of claim 6, wherein the vehicle cambers using non-active mechanisms to control the camber.

12. The vehicle of claim 6, wherein cambering is defined as tires and wheels enabled to camber greater than 6 degrees and the main body rotation exceeding 3 degrees when the vehicle is cornering.

13. The vehicle of claim 6, further comprising:
an electric wheel motor; and
a hybrid drivetrain.

14. A vehicle of claim 6, wherein the occupant entry and egress is executed by stepping in and out of upper openings in the structure, thereby averting the use of doors.

15. A vehicle of claim 6, wherein a side pod is used to facilitate occupant entry and egress.

16. The vehicle of claim 6, further comprising:
a thermoelectric module comprising a thermoelectric device, wherein the thermoelectric device connects at least a first planar substrate and a second planar substrate, wherein the first planar substrate and the second planar substrate are connected to the thermoelectric device via a metallization pattern, the substrates being thermally-conductive and electrically-isolated, and wherein the thermoelectric module is in contact with at least a hot fluid passage and a cold fluid passage.

17. The vehicle of claim 16, wherein the hot fluid passage and the cold fluid passage are each formed by plates and alternating and fastened fins.

18. The vehicle of claim 16, wherein the thermoelectric module is connected to a DC-DC Conversion device for energy transfer to an energy storage system.

19. The vehicle of claim 17, wherein the hot fluid has a higher temperature than the cold fluid.

20. The vehicle of claim 6, further comprising a system for providing power to drive the vehicle, comprising:
an internal combustion engine;
a generator coupled to the internal combustion engine;
an energy storage and management system connected to the generator, the energy storage and management system comprising (i) a comparative circuit for monitoring a primary voltage from a power source to a load, (ii) a DC-DC boost converter connected to the load, and (iii) a contactor switch in series between the power source and the load, the switch configured to select either a direct connection from the power source to the load or a connection from the power source through a DC-DC boost converter to the load, the switch selection based on a first voltage threshold level,
wherein the generator is configured to (i) provide power to the load from the internal combustion engine when the power source is below a second threshold level and to (ii) recharge the power source.

21. The vehicle of claim 6, further comprising a roll cage.

22. The vehicle of claim 6, further comprising a structural contact member positioned at the front of each of the front vehicle wheels.

23. The vehicle of claim 22, wherein the structural member is hinged to compress a first member.

24. The vehicle of claim 21, further comprising external panels, wherein the external panels can be clipped onto the body of the vehicle.

* * * * *